United States Patent
Iiyama et al.

(10) Patent No.: US 9,455,457 B2
(45) Date of Patent: Sep. 27, 2016

(54) FUEL CELL SYSTEM AND METHOD OF OPERATING FUEL CELL SYSTEM

(71) Applicant: Panasonic Intellectual Property Management Co., Ltd., Osaka (JP)

(72) Inventors: Shigeru Iiyama, Osaka (JP); Hirofumi Kokubu, Shiga (JP); Takahiro Kusuyama, Osaka (JP); Hiroaki Kitagawa, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 10 days.

(21) Appl. No.: 14/406,462

(22) PCT Filed: Apr. 9, 2014

(86) PCT No.: PCT/JP2014/002033
§ 371 (c)(1),
(2) Date: Dec. 8, 2014

(87) PCT Pub. No.: WO2014/167850
PCT Pub. Date: Oct. 16, 2014

(65) Prior Publication Data
US 2015/0155575 A1 Jun. 4, 2015

(30) Foreign Application Priority Data
Apr. 9, 2013 (JP) .................. 2013-081276

(51) Int. Cl.
*H01M 8/04* (2016.01)
*H01M 8/06* (2016.01)
(Continued)

(52) U.S. Cl.
CPC ............ *H01M 8/04201* (2013.01); *C01B 3/38* (2013.01); *H01M 8/04223* (2013.01); *H01M 8/04365* (2013.01); *H01M 8/04753* (2013.01); *H01M 8/0618* (2013.01); *H01M 8/086* (2013.01); *H01M 2008/1095* (2013.01);
(Continued)

(58) Field of Classification Search
None
See application file for complete search history.

(56) References Cited

U.S. PATENT DOCUMENTS

| 6,773,839 B2 * | 8/2004 | Fuglevand | ........ H01M 8/04007 429/430 |
| 2004/0137291 A1 * | 7/2004 | Smedley | ............. H01M 6/5038 429/418 |

(Continued)

FOREIGN PATENT DOCUMENTS

| EP | 1538126 A1 | 6/2005 |
| EP | 2455335 A1 | 5/2012 |

(Continued)

OTHER PUBLICATIONS

J-PlatPat Machine translation of the detailed description of JP 2007-140781A (Jun. 2010).*

(Continued)

*Primary Examiner* — Gregg Cantelmo
(74) *Attorney, Agent, or Firm* — McDermott Will & Emery LLP

(57) ABSTRACT

A fuel cell system includes: a fuel cell configured to generate electric power by using a hydrogen-containing gas; a catalyst, which reacts with an oxidizing gas by oxidation; an oxidizing gas supply device configured to supply the oxidizing gas to the catalyst; and a controller configured to control, before removal of the catalyst to outside, the oxidizing gas supply device to perform an oxidizing process of oxidizing the catalyst.

17 Claims, 24 Drawing Sheets

(51) Int. Cl.
  *H01M 8/08* (2016.01)
  *C01B 3/38* (2006.01)
  *H01M 8/10* (2016.01)
  *H01M 8/12* (2016.01)
(52) U.S. Cl.
  CPC ...... *H01M 2008/1293* (2013.01); *Y02E 60/50* (2013.01); *Y02E 60/525* (2013.01)

(56) References Cited

U.S. PATENT DOCUMENTS

2009/0110993 A1* 4/2009 Backhaus-Ricoult ............. H01M 8/04223 429/433
2014/0072892 A1 3/2014 Maenishi et al.

FOREIGN PATENT DOCUMENTS

| | | |
|---|---|---|
| EP | 2509144 A1 | 10/2012 |
| JP | 11-097051 A | 4/1999 |
| JP | 2001-185196 A | 7/2001 |
| JP | 2001-185197 A | 7/2001 |
| JP | 2003-017109 A | 1/2003 |
| JP | 2003-272691 A | 9/2003 |
| JP | 2006-092764 A | 4/2006 |
| JP | 2008-169100 A | 7/2008 |
| JP | 2009-227479 A | 10/2009 |
| JP | 2010140781 A * | 6/2010 |
| WO | 2006/077461 A2 | 7/2006 |
| WO | WO 2006077461 A2 * | 7/2006 ............. H01M 4/92 |

OTHER PUBLICATIONS

International Search Report issued in PCT/JP2014/002033, dated Jul. 15, 2014, with English translation.
Japanese Office Action dated Jul. 7, 2015 issued in Japanese Patent Application No. 2014-553372.
Extended European Search Report issued in Application No. 14782458.5 dated Jan. 18, 2016.

* cited by examiner

FUEL CELL SYSTEM AND METHOD OF OPERATING FUEL CELL SYSTEM

RELATED APPLICATIONS

This application is the U.S. National Phase under 35 U.S.C. §371 of International Application No. PCT/JP2014/002033, filed on Apr. 9, 2014, which in turn claims the benefit of Japanese Application No. 2013-081276, filed on Apr. 9, 2013, the disclosures of which Applications are incorporated by reference herein.

TECHNICAL FIELD

The present invention relates to fuel cell systems and methods of operating fuel cell systems.

BACKGROUND ART

In a fuel cell system, a catalyst that reacts with an oxidizing gas by oxidation is used. In view of this, there is a proposed method in which, in the process of manufacturing a fuel cell system, before the catalyst is placed inside an apparatus and the apparatus is sealed up, the catalyst is partially oxidized and thereby the stability of the catalyst in air is increased (see Patent Literature 1, for example).

CITATION LIST

Patent Literature

PTL 1: Japanese Laid-Open Patent Application Publication No. 2008-169100

SUMMARY OF INVENTION

Technical Problem

However, Patent Literature 1 gives no description regarding a treatment process to be performed on the catalyst that reacts by oxidation, which is to be performed at the time of removing the catalyst to the outside of a container containing the catalyst in the case of, for example, disposal or maintenance of the fuel cell system or hydrogen generation apparatus.

One aspect of the present invention has been made in view of the above. An object of the one aspect of the present invention is to provide a fuel cell system and a method of operating a fuel cell system, which make it possible to reduce, at the time of removing the catalyst to the outside of the container containing the catalyst, the amount of heat generated due to the oxidation reaction of the catalyst as compared to conventional art.

Solution to Problem

A fuel cell system according to one aspect of the present invention includes: a fuel cell configured to generate electric power by using a hydrogen-containing gas; a catalyst, which reacts with an oxidizing gas by oxidation; an oxidizing gas supply device configured to supply the oxidizing gas to the catalyst; and a controller configured to control, before removal of the catalyst to outside, the oxidizing gas supply device to perform an oxidizing process of oxidizing the catalyst.

A method of operating a fuel cell system according to another aspect of the present invention includes: generating electric power by a fuel cell by using a hydrogen-containing gas when the fuel cell system is in operation; and controlling, before removal of a catalyst to outside, an oxidizing gas supply device to perform an oxidizing process of oxidizing the catalyst, which reacts with an oxidizing gas by oxidation.

Advantageous Effects of Invention

The fuel cell system and the method of operating a fuel cell system according to the aspects of the present invention make it possible to reduce, at the time of removing the catalyst to the outside of a container containing the catalyst, the amount of heat generated due to the oxidation reaction of the catalyst as compared to conventional art.

DESCRIPTION OF EMBODIMENTS

Embodiment 1

Figure 1:
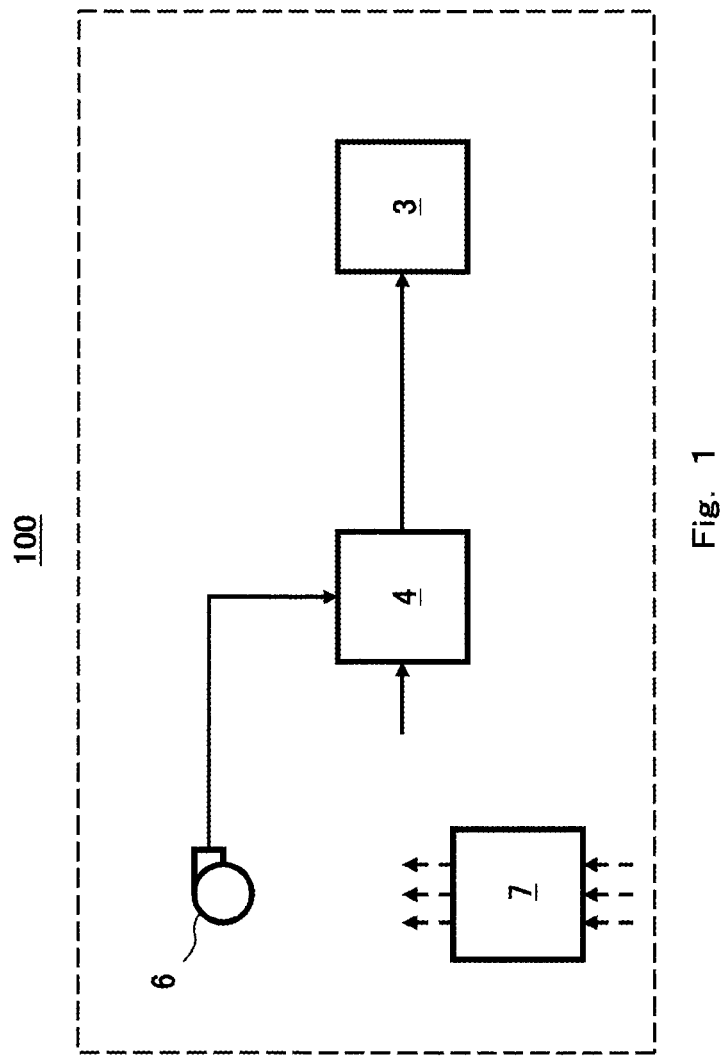
FIG. 1 shows one example of a fuel cell system according to Embodiment 1.

The inventors of the present invention conducted diligent studies on the aforementioned treatment process, which is to be performed, for example, in the disposal process or maintenance in order to reduce the amount of heat generated by the catalyst when the catalyst is removed to the outside of the container containing the catalyst. As a result of the diligent studies, the inventors have obtained findings described below.

In the disposal process of a fuel cell system or hydrogen generation apparatus, when the container containing the catalyst is disassembled and thereby the catalyst, which reacts with an oxidizing gas by oxidation, is exposed to the outside (i.e., to the atmosphere), the oxidation reaction of the catalyst proceeds rapidly. As a result, the catalyst generates a large amount of heat, which is undesirable for workers performing the disposal process.

In this respect, the inventors have arrived at the fact that, for example, by performing an oxidizing process of oxidizing the catalyst before removal of the catalyst to the outside of the container, the amount of heat generated by the catalyst when the catalyst is removed to the outside of the container in the disposal process can be reduced.

In view of the above, a fuel cell system according to Embodiment 1 includes: a fuel cell configured to generate electric power by using a hydrogen-containing gas; a catalyst, which reacts with an oxidizing gas by oxidation; an oxidizing gas supply device configured to supply the oxidizing gas to the catalyst; and a controller configured to control, before removal of the catalyst to outside, the oxidizing gas supply device to perform an oxidizing process of oxidizing the catalyst.

In addition, a method of operating a fuel cell system according to Embodiment 1 includes: generating electric power by a fuel cell by using a hydrogen-containing gas when the fuel cell system is in operation; and controlling, before removal of a catalyst to outside, an oxidizing gas supply device to perform an oxidizing process of oxidizing the catalyst, which reacts with an oxidizing gas by oxidation.

According to the above, in the disposal process, at the time of removing the catalyst to the outside of the container containing the catalyst, the amount of heat generated due to the oxidation reaction of the catalyst can be reduced compared to conventional art.

The wording "before removal of the catalyst to outside" herein means a period from when the fuel cell system stops electric power generation to when the catalyst is removed to the outside. It should be noted that this power generation stop of the fuel cell is the power generation stop that is followed by disposal of the fuel cell.

Accordingly, in the above period, the oxidizing process may be performed at any timing. For example, the oxidizing process may be performed as part of a stop process after the power generation stop, or the oxidizing process may be performed after the completion of the stop process when an operator has inputted a command to the fuel cell system to perform the oxidizing process.

[Apparatus Configuration]

FIG. 1 shows one example of the fuel cell system according to Embodiment 1.

In the example shown in FIG. 1, a fuel cell system 100 according to the present embodiment includes a fuel cell 3, a catalyst 4, an oxidizing gas supply device 6, and a controller 7.

The fuel cell 3 generates electric power by using a hydrogen-containing gas. Specifically, in the fuel cell 3, oxygen in air and hydrogen in the hydrogen-containing gas chemically react with each other, and thereby electric power and heat are generated. The fuel cell 3 may be configured as any type of fuel cell. Examples of the fuel cell 3 include a polymer electrolyte fuel cell, a solid oxide fuel cell, and a phosphoric acid fuel cell.

The catalyst 4 reacts with an oxidizing gas by oxidation. Accordingly, for example, in the disposal process of the fuel cell system 100 or hydrogen generation apparatus, when the inside of the apparatus is opened, the oxidation reaction of the catalyst 4 occurs. As a result, the catalyst 4 generates heat. The oxidizing gas herein is a gas containing oxygen. The oxidizing gas is air, for example. Specific examples of the catalyst 4 are given in Examples described below.

The oxidizing gas supply device 6 supplies the oxidizing gas to the catalyst 4. The oxidizing gas supply device 6 may be configured in any form, so long as the oxidizing gas supply device 6 is configured to supply the oxidizing gas to the catalyst 4. The oxidizing gas supply device 6 is an air blower, for example. The controller 7, before removal of the catalyst 4 to the outside, controls the oxidizing gas supply device 6 to perform an oxidizing process of oxidizing the catalyst 4. For example, after stopping the fuel cell system 100 from generating electric power, in disposing of, for example, the fuel cell system 100 or hydrogen generation apparatus, the controller 7 may control, during a period until the catalyst 4 is removed to the outside of a container containing the catalyst 4, the oxidizing gas supply device 6 to perform the oxidizing process of oxidizing the catalyst 4 in a state where the hydrogen-containing gas is not flowing over the catalyst 4, which reacts with the oxidizing gas by oxidation.

The controller 7 may be configured in any form, so long as the controller 7 has control functions. For example, the controller 7 may include an arithmetic processing unit and a storage unit storing control programs. Examples of the arithmetic processing unit include an MPU and a CPU. The storage unit is a memory, for example. The controller may be configured as a single controller performing centralized control, or may be configured as a group of multiple controllers performing distributed control in cooperation with each other.

[Operations]

Hereinafter, operations of the fuel cell system 100 according to the present embodiment are described with reference to FIG. 1.

The fuel cell 3 generates electric power by using the hydrogen-containing gas when the fuel cell system 100 is in operation.

The controller 7, before removal of the catalyst 4 to the outside, controls the oxidizing gas supply device 6 to perform the oxidizing process of oxidizing the catalyst 4.

For example, after stopping the fuel cell system 100 from generating electric power, in disposing of, for example, the fuel cell system 100 or hydrogen generation apparatus, the controller 7 may control, during a period until the catalyst 4 is removed to the outside of the container, the oxidizing gas supply device 6 to perform the oxidizing process of oxidizing the catalyst 4 in a state where the hydrogen-containing gas is not flowing over the catalyst 4, which reacts with the oxidizing gas by oxidation.

According to the above, before removal of the catalyst 4 to the outside, the oxidizing process of oxidizing the catalyst 4 is performed. Therefore, in the disposal process, at the time of removing the catalyst 4 to the outside of the container containing the catalyst 4, the amount of heat generated due to the oxidation reaction of the catalyst 4 can be reduced compared to conventional art.

Example 1

A fuel cell system according to Example 1 of Embodiment 1 is configured such that, in the fuel cell system according to Embodiment 1, the controller, before removal of the catalyst to the outside, controls the oxidizing gas supply device to supply the oxidizing gas to the catalyst to perform the oxidizing process of oxidizing the catalyst, the oxidizing gas being in an amount greater than an amount of oxidizing gas supplied to the catalyst at a normal power generation stop.

A method of operating a fuel cell system according to Example 1 of Embodiment 1 is such that the method of operating a fuel cell system according to Embodiment 1 includes controlling, before removal of the catalyst to the outside, the oxidizing gas supply device to supply the oxidizing gas to the catalyst to perform the oxidizing process of oxidizing the catalyst, the oxidizing gas being in an amount greater than an amount of oxidizing gas supplied to the catalyst at a normal power generation stop.

According to the above, before removal of the catalyst to the outside, the oxidizing process of oxidizing the catalyst is performed by using the oxidizing gas in an amount greater than the amount of oxidizing gas used at a normal power generation stop. Therefore, in the disposal process, at the time of removing the catalyst to the outside of the container containing the catalyst, the amount of heat generated due to the oxidation reaction of the catalyst can be reduced compared to conventional art.

Other than the above-described feature, the configuration of the fuel cell system according to Example 1 may be the same as the configuration of the fuel cell system according to Embodiment 1.

Other than the above-described feature, the method of operating a fuel cell system according to Example 1 may be the same as the method of operating a fuel cell system according to Embodiment 1.

[Apparatus Configuration]

Since the apparatus configuration of the fuel cell system according to Example 1 is the same as the apparatus configuration described in Embodiment 1, the description of the apparatus configuration is omitted.

[Operations]

Hereinafter, operations of the fuel cell system 100 according to Example 1 are described with reference to FIG. 1.

The fuel cell 3 generates electric power by using the hydrogen-containing gas when the fuel cell system 100 is in operation.

The controller 7, before removal of the catalyst 4 to the outside, controls the oxidizing gas supply device 6 to supply the oxidizing gas to the catalyst 4 to perform the oxidizing process of oxidizing the catalyst 4, the oxidizing gas being in an amount greater than the amount of oxidizing gas supplied to the catalyst 4 at a normal power generation stop. Specifically, during a period from when the fuel cell system 100 to be disposed of stops electric power generation to when the catalyst is removed to the outside of the container, the oxidizing gas is supplied to the catalyst 4, such that the cumulative supply amount of the oxidizing gas during the period is greater than the cumulative supply amount of the oxidizing gas during a normal power generation stop.

According to the above, before removal of the catalyst 4 to the outside, the oxidizing process of oxidizing the catalyst 4 is performed by using the oxidizing gas in an amount greater than the amount of oxidizing gas used at a normal power generation stop. Therefore, in the disposal process, at the time of removing the catalyst 4 to the outside of the container containing the catalyst 4, the amount of heat generated due to the oxidation reaction of the catalyst 4 can be reduced compared to conventional art.

Example 2

A fuel cell system according to Example 1 of Embodiment 1 is configured such that, in the fuel cell system according to Embodiment 1, the catalyst contains a base metal.

According to the above configuration, in the disposal process, at the time of removing the catalyst to the outside of the container containing the catalyst, the amount of heat generated due to the oxidation reaction of the catalyst containing the base metal can be reduced compared to conventional art.

Other than the above-described feature, the configuration of the fuel cell system according to Example 2 may be the same as the configuration of the fuel cell system according to Embodiment 1.

[Apparatus Configuration]

Figure 2:
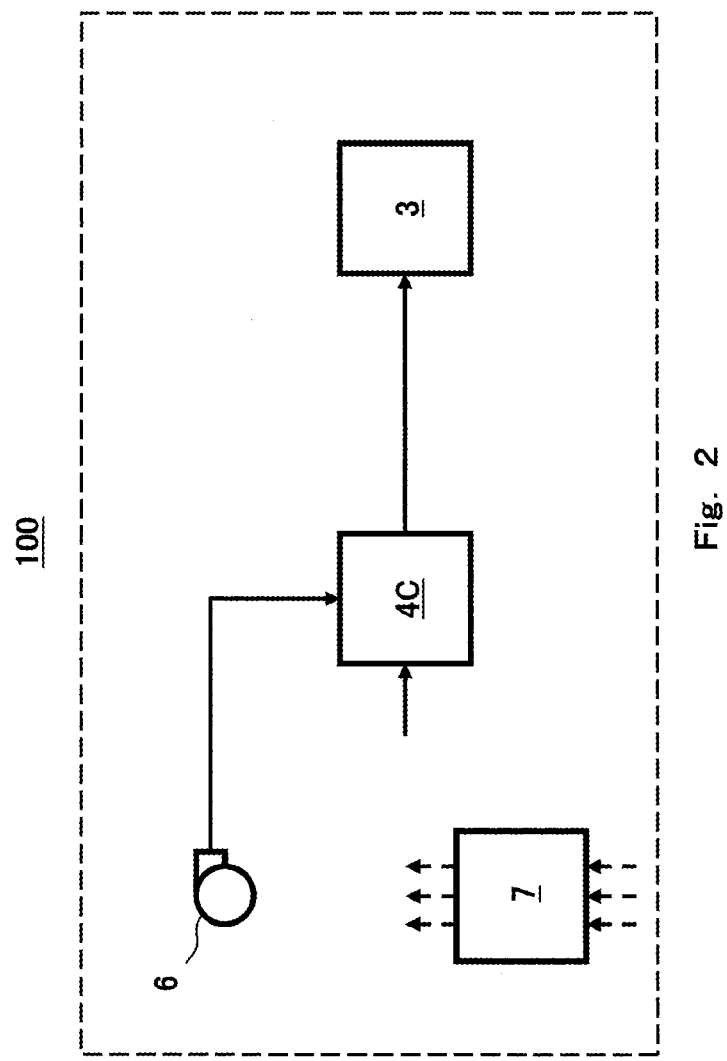
FIG. 2 shows one example of a fuel cell system according to Example 2 of Embodiment 1.

FIG. 2 shows one example of the fuel cell system according to Example 2 of Embodiment 1.

In the example shown in FIG. 2, the fuel cell system 100 according to Example 2 includes the fuel cell 3, a catalyst 4C, the oxidizing gas supply device 6, and the controller 7.

Since the fuel cell 3, the oxidizing gas supply device 6, and the controller 7 are the same as those described in Embodiment 1, the description of these components is omitted.

The catalyst 4C contains a base metal. That is, examples of the catalyst metal of the catalyst 4C, which reacts with the oxidizing gas by oxidation, include a base metal.

When the fuel cell system 100 is operated, the catalyst 4C needs to be kept in a reduced state. Therefore, in the disposal process, when the catalyst 4C is removed to the outside of the container containing the catalyst 4C, the oxidation reaction of the catalyst 4C occurs rapidly. As a result, the catalyst 4C generates a large amount of heat.

It should be noted that examples of the base metal include Ni, Cu, and Zn.

[Operations]

Hereinafter, operations of the fuel cell system 100 according to Example 2 are described with reference to FIG. 2.

The fuel cell 3 generates electric power by using the hydrogen-containing gas when the fuel cell system 100 is in operation.

The controller 7, before removal of the catalyst 4C containing the base metal to the outside, controls the oxidizing gas supply device 6 to perform the oxidizing process of oxidizing the catalyst 4C.

According to the above, before removal of the catalyst 4C containing the base metal to the outside, the oxidizing process of oxidizing the catalyst 4C is performed. Therefore, in the disposal process, at the time of removing the catalyst 4C to the outside of the container containing the catalyst 4C, the amount of heat generated due to the oxidation reaction of the catalyst 4C can be reduced compared to conventional art.

Example 3

A fuel cell system according to Example 3 of Embodiment 1 is configured such that the fuel cell system according to Embodiment 1 includes a reactor including the catalyst, and the controller, in the oxidizing process, controls the oxidizing gas supply device to supply, to the reactor, the oxidizing gas in an amount at least greater than or equal to a volume of the reactor.

A method of operating a fuel cell system according to Example 3 of Embodiment 1 is such that, in the method of operating a fuel cell system according to Embodiment 1, in the oxidizing process, the oxidizing gas supply device supplies, to a reactor including the catalyst, the oxidizing gas in an amount at least greater than or equal to a volume of the reactor.

According to the above, the oxidizing process of oxidizing the catalyst is performed by using the oxidizing gas in an amount greater than or equal to the volume of the reactor. Therefore, in the disposal process, at the time of removing the catalyst to the outside of the container containing the catalyst, the amount of heat generated due to the oxidation reaction of the catalyst can be reduced compared to conventional art.

Other than the above-described feature, the configuration of the fuel cell system according to Example 3 may be the same as the configuration of the fuel cell system according to Embodiment 1.

Other than the above-described feature, the method of operating a fuel cell system according to Example 3 may be the same as the method of operating a fuel cell system according to Embodiment 1.

[Apparatus Configuration]

Figure 3:
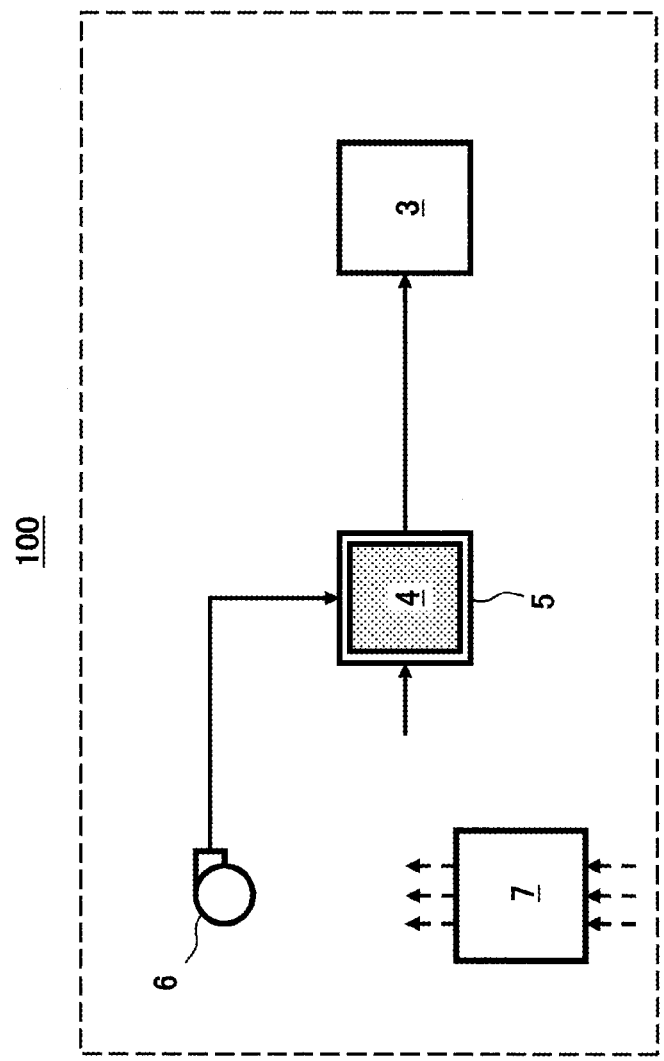
FIG. 3 shows one example of a fuel cell system according to Example 3 of Embodiment 1.

FIG. 3 shows one example of the fuel cell system according to Example 3 of Embodiment 1.

In the example shown in FIG. 3, the fuel cell system 100 according to Example 3 includes the fuel cell 3, the catalyst 4, a reactor 5, the oxidizing gas supply device 6, and the controller 7.

Since the fuel cell 3, the catalyst 4, the oxidizing gas supply device 6, and the controller 7 are the same as those described in Embodiment 1, the description of these components is omitted.

The reactor 5 includes the catalyst 4. That is, the inside of the reactor 5 is packed with the catalyst 4.

[Operations]

Hereinafter, operations of the fuel cell system 100 according to Example 3 are described with reference to FIG. 3.

The fuel cell 3 generates electric power by using the hydrogen-containing gas when the fuel cell system 100 is in operation.

The controller 7, in the oxidizing process, controls the oxidizing gas supply device 6 to supply, to the reactor 5, the oxidizing gas in an amount at least greater than or equal to the volume of the reactor 5.

It should be noted that, in the oxidizing process, the amount of oxidizing gas supplied to the reactor 5 may be any amount, so long as the amount is greater than or equal to the volume of the reactor 5. For example, the oxidizing gas containing oxygen in an amount that allows the catalyst 4 to be completely oxidized (specifically, about three times as great as the volume of the reactor 5) may be supplied to the catalyst 4.

According to the above, the oxidizing process of oxidizing the catalyst 4 is performed by using the oxidizing gas in an amount greater than or equal to the volume of the reactor 5. Therefore, in the disposal process, at the time of removing the catalyst 4 to the outside of the reactor 5 containing the catalyst 4, the amount of heat generated due to the oxidation reaction of the catalyst 4 can be reduced compared to conventional art.

Example 4

A fuel cell system according to Example 4 of Embodiment 1 is configured such that, in the fuel cell system according to Embodiment 1, the controller, in the oxidizing process, controls the oxidizing gas supply device to supply oxygen at least in molar equivalents necessary for an oxidation reaction of the catalyst.

According to the above configuration, the oxidizing process of oxidizing the catalyst is performed by using oxygen in molar equivalents necessary for the oxidation reaction of the catalyst. Therefore, in the disposal process, at the time of removing the catalyst to the outside of the container containing the catalyst, the amount of heat generated due to the oxidation reaction of the catalyst can be reduced compared to conventional art.

Other than the above-described feature, the configuration of the fuel cell system according to Example 4 may be the same as the configuration of the fuel cell system according to Embodiment 1.

[Apparatus Configuration]

Since the apparatus configuration of the fuel cell system according to Example 4 is the same as the apparatus configuration described in Embodiment 1, the description of the apparatus configuration is omitted.

[Operations]

Hereinafter, operations of the fuel cell system 100 according to Example 4 are described with reference to FIG. 1.

The fuel cell 3 generates electric power by using the hydrogen-containing gas when the fuel cell system 100 is in operation.

The controller 7, in the oxidizing process, controls the oxidizing gas supply device 6 to supply oxygen at least in molar equivalents necessary for the oxidation reaction of the catalyst 4.

According to the above, the oxidizing process of oxidizing the catalyst 4 is performed by using oxygen in molar equivalents necessary for the oxidation reaction of the catalyst 4. Therefore, in the disposal process, at the time of removing the catalyst 4 to the outside of the container containing the catalyst 4, the amount of heat generated due to the oxidation reaction of the catalyst 4 can be reduced compared to conventional art.

Example 5

A fuel cell system according to Example 5 of Embodiment 1 is configured such that, in the fuel cell system according to any one of Embodiment 1 and Examples 1 to 4 of Embodiment 1, the oxidizing process includes a period in which no raw material flows over the catalyst.

A method of operating a fuel cell system according to Example 5 of Embodiment 1 is such that, in the method of operating a fuel cell system according to any one of Embodiment 1 and Examples 1 to 3 of Embodiment 1, the oxidizing process includes a period in which no raw material flows over the catalyst In the oxidizing process of oxidizing the catalyst, if a raw material is flowed over the catalyst, there is a possibility that catalytic combustion of the raw material occurs, in which the raw material reacts with oxygen, causing a decrease in the amount of oxygen to be utilized in the oxidizing process of oxidizing the catalyst. However, in a case where the oxidizing process of oxidizing the catalyst includes a period in which no raw material flows over the catalyst as described above, such possibility can be lowered. In this case, in the disposal process, at the time of removing the catalyst to the outside of the container containing the catalyst, the amount of heat generated due to the oxidation reaction of the catalyst can be reduced compared to a case where the oxidizing process of oxidizing the catalyst does not include a period in which no raw material flows over the catalyst.

Other than the above-described feature, the configuration of the fuel cell system according to Example 5 may be the same as the configuration of the fuel cell system according to any one of Embodiment 1 and Examples 1 to 4 of Embodiment 1.

Other than the above-described feature, the method of operating a fuel cell system according to Example 5 may be the same as the method of operating a fuel cell system according to any one of Embodiment 1 and Examples 1 to 3 of Embodiment 1.

[Apparatus Configuration]

Since the apparatus configuration of the fuel cell system according to Example 5 is the same as the apparatus configuration described in Embodiment 1, the description of the apparatus configuration is omitted.

[Operations]

Hereinafter, operations of the fuel cell system 100 according to Example 5 are described with reference to FIG. 1.

The fuel cell 3 generates electric power by using the hydrogen-containing gas when the fuel cell system 100 is in operation.

The controller 7, before removal of the catalyst 4 to the outside, controls the oxidizing gas supply device 6 to perform the oxidizing process of oxidizing the catalyst 4. At the time, the oxidizing process of oxidizing the catalyst 4 includes a period in which no raw material flows over the catalyst 4. It should be noted that the raw material is, for example, an organic compound comprised of at least carbon and hydrogen, such as city gas or natural gas both containing methane as a main component, or LPG In the oxidizing process of oxidizing the catalyst 4, if the raw material is flowed over the catalyst 4, there is a possibility that catalytic combustion of the raw material occurs, in which the raw material reacts with oxygen, causing a decrease in the amount of oxygen to be utilized in the oxidizing process of oxidizing the catalyst 4. However, in a case where the oxidizing process of oxidizing the catalyst 4 includes a period in which no raw material flows over the catalyst 4 as described above, such possibility can be lowered. In this case, in the disposal process, at the time of removing the catalyst 4 to the outside of the container containing the catalyst 4, the amount of heat generated due to the oxidation reaction of the catalyst 4 can be reduced compared to a case where the oxidizing process of oxidizing the catalyst 4 does not include a period in which no raw material flows over the catalyst 4.

Example 6

A fuel cell system according to Example 6 of Embodiment 1 is configured such that, in the fuel cell system according to any one of Embodiment 1 and Examples 1 to 4 of Embodiment 1, the oxidizing process includes a period in which no gas other than the oxidizing gas flows over the catalyst.

A method of operating a fuel cell system according to Example 5 of Embodiment 1 is such that, in the method of operating a fuel cell system according to any one of Embodiment 1 and Examples 1 to 3 of Embodiment 1, the oxidizing process includes a period in which no gas other than the oxidizing gas flows over the catalyst.

In the oxidizing process of oxidizing the catalyst, if any gas other than the oxidizing gas is flowed over the catalyst, there is a possibility that catalytic combustion of the gas occurs, in which the gas reacts with oxygen, causing a decrease in the amount of oxygen to be utilized in the oxidizing process of oxidizing the catalyst. However, in a case where the oxidizing process of oxidizing the catalyst includes a period in which no gas other than the oxidizing gas flows over the catalyst as described above, such possibility can be lowered. In this case, in the disposal process, at the time of removing the catalyst to the outside of the container containing the catalyst, the amount of heat generated due to the oxidation reaction of the catalyst can be reduced compared to a case where the oxidizing process of oxidizing the catalyst does not include a period in which no gas other than the oxidizing gas flows over the catalyst.

Other than the above-described feature, the configuration of the fuel cell system according to Example 6 may be the same as the configuration of the fuel cell system according to any one of Embodiment 1 and Examples 1 to 4 of Embodiment 1.

Other than the above-described feature, the method of operating a fuel cell system according to Example 6 may be the same as the method of operating a fuel cell system according to any one of Embodiment 1 and Examples 1 to 3 of Embodiment 1.

[Apparatus Configuration]

Since the apparatus configuration of the fuel cell system according to Example 6 is the same as the apparatus configuration described in Embodiment 1, the description of the apparatus configuration is omitted.

[Operations]

Hereinafter, operations of the fuel cell system 100 according to Example 6 are described with reference to FIG. 1.

The fuel cell 3 generates electric power by using the hydrogen-containing gas when the fuel cell system 100 is in operation.

The controller 7, before removal of the catalyst 4 to the outside, controls the oxidizing gas supply device 6 to perform the oxidizing process of oxidizing the catalyst 4. At the time, the oxidizing process of oxidizing the catalyst 4 includes a period in which no gas other than the oxidizing gas flows over the catalyst 4.

In the oxidizing process of oxidizing the catalyst 4, if any gas other than the oxidizing gas is flowed over the catalyst 4, there is a possibility that catalytic combustion of the gas occurs, in which the gas reacts with oxygen, causing a decrease in the amount of oxygen to be utilized in the oxidizing process of oxidizing the catalyst 4. However, in a case where the oxidizing process of oxidizing the catalyst 4 includes a period in which no gas other than the oxidizing gas flows over the catalyst 4 as described above, such possibility can be lowered. In this case, in the disposal process, at the time of removing the catalyst 4 to the outside of the container containing the catalyst 4, the amount of heat generated due to the oxidation reaction of the catalyst 4 can be reduced compared to a case where the oxidizing process of oxidizing the catalyst 4 does not include a period in which no gas other than the oxidizing gas flows over the catalyst 4.

Example 7

A fuel cell system according to Example 7 of Embodiment 1 is configured such that, in the fuel cell system according to any one of Embodiment 1 and Examples 1 to 6 of Embodiment 1, the catalyst is a shift conversion catalyst According to the above configuration, in the disposal process, at the time of removing the shift conversion catalyst to the outside of the container containing the shift conversion catalyst, the amount of heat generated due to the oxidation reaction of the shift conversion catalyst can be reduced compared to conventional art.

Other than the above-described feature, the configuration of the fuel cell system according to Example 7 may be the same as the configuration of the fuel cell system according to any one of Embodiment 1 and Examples 1 to 6 of Embodiment 1.

[Apparatus Configuration]

Figure 4:
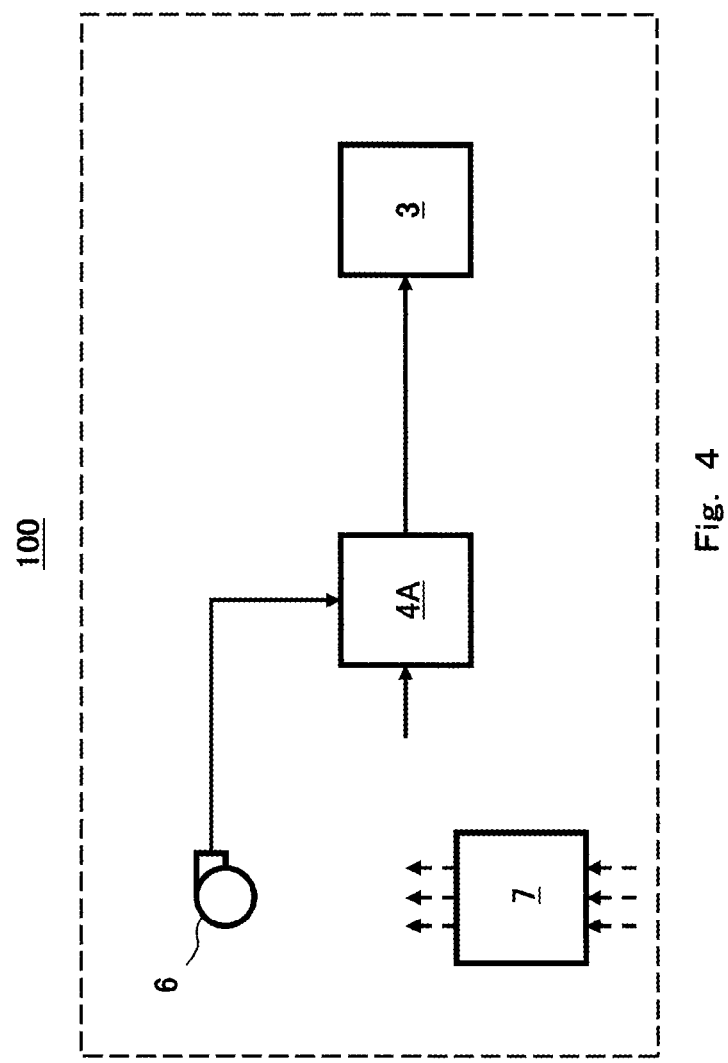
FIG. 4 shows one example of a fuel cell system according to Example 7 of Embodiment 1.

FIG. 4 shows one example of the fuel cell system according to Example 7 of Embodiment 1.

In the example shown in FIG. 4, the fuel cell system 100 according to Example 7 includes the fuel cell 3, a shift conversion catalyst 4A, the oxidizing gas supply device 6, and the controller 7.

Since the fuel cell 3, the oxidizing gas supply device 6, and the controller 7 are the same as those described above, the description of these components is omitted.

In a case where the fuel cell 3 is, for example, a polymer electrolyte fuel cell, the shift conversion catalyst 4A is one example of the catalyst 4, which reacts with the oxidizing gas by oxidation. Specifically, when the fuel cell system 100 is operated, the shift conversion catalyst 4A needs to be kept in a reduced state. Therefore, in the disposal process, when the shift conversion catalyst 4A is removed to the outside of the container containing the shift conversion catalyst 4A, the oxidation reaction of the shift conversion catalyst 4A occurs rapidly. As a result, the shift conversion catalyst 4A generates a large amount of heat.

It should be noted that examples of the catalyst metal of the shift conversion catalyst 4A include Cu and Zn.

[Operations]

Hereinafter, operations of the fuel cell system 100 according to Example 7 are described with reference to FIG. 4.

The fuel cell 3 generates electric power by using the hydrogen-containing gas when the fuel cell system 100 is in operation. At the time, carbon monoxide in the hydrogen-containing gas is reduced owing to a shift reaction proceeding over the shift conversion catalyst 4A.

The controller 7, before removal of the shift conversion catalyst 4A to the outside, controls the oxidizing gas supply device 6 to perform the oxidizing process of oxidizing the shift conversion catalyst 4A. For example, after stopping the fuel cell system 100 from generating electric power, in disposing of, for example, the fuel cell system 100 or hydrogen generation apparatus, the controller 7 may control, during a period until the shift conversion catalyst 4A is removed to the outside of the container, the oxidizing gas supply device 6 to perform the oxidizing process of oxidizing the shift conversion catalyst 4A in a state where the hydrogen-containing gas is not flowing over the shift conversion catalyst 4A, which reacts with the oxidizing gas by oxidation.

According to the above, before removal of the shift conversion catalyst 4A to the outside, the oxidizing process of oxidizing the shift conversion catalyst 4A is performed. Therefore, in the disposal process, at the time of removing the shift conversion catalyst 4A to the outside of the container containing the shift conversion catalyst 4A, the amount of heat generated due to the oxidation reaction of the shift conversion catalyst 4A can be reduced compared to conventional art.

Example 8

A fuel cell system according to Example 8 of Embodiment 1 is configured such that, in the fuel cell system according to any one of Embodiment 1 and Examples 1 to 6 of Embodiment 1, the catalyst is a hydrodesulfurization catalyst According to the above configuration, in the disposal process, at the time of removing the hydrodesulfurization catalyst to the outside of the container containing the hydrodesulfurization catalyst, the amount of heat generated due to the oxidation reaction of the hydrodesulfurization catalyst can be reduced compared to conventional art.

Other than the above-described feature, the configuration of the fuel cell system according to Example 8 may be the same as the configuration of the fuel cell system according to any one of Embodiment 1 and Examples 1 to 6 of Embodiment 1.

[Apparatus Configuration]

Figure 5:
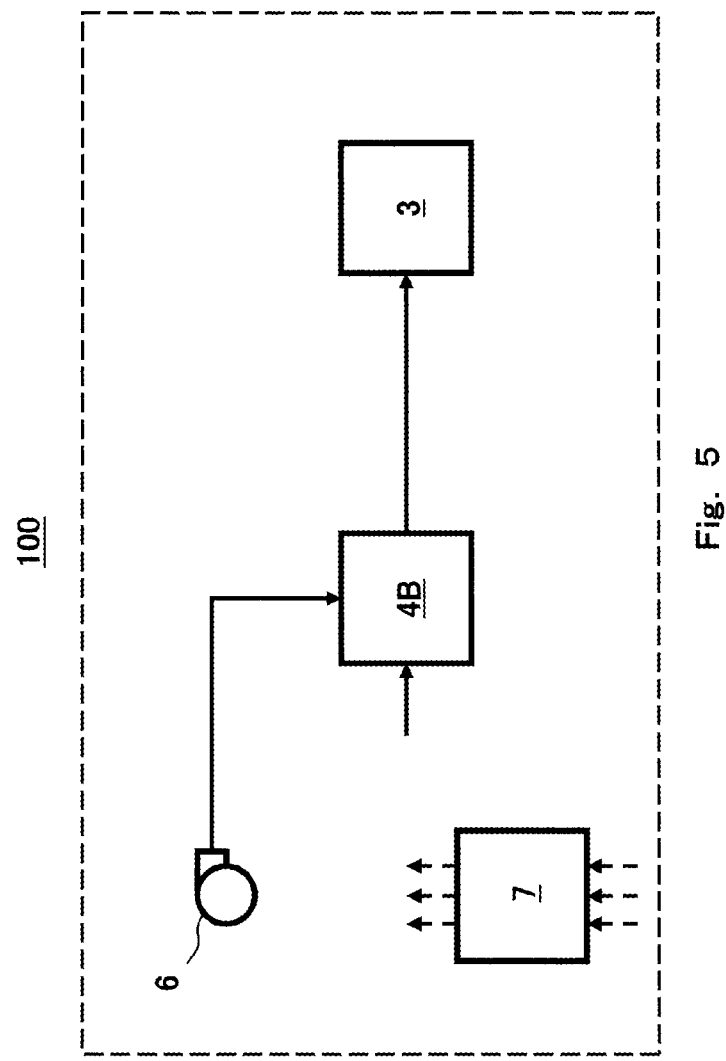
FIG. 5 shows one example of a fuel cell system according to Example 8 of Embodiment 1.

FIG. 5 shows one example of the fuel cell system according to Example 8 of Embodiment 1.

In the example shown in FIG. 5, the fuel cell system 100 according to Example 8 includes the fuel cell 3, a hydrodesulfurization catalyst 4B, the oxidizing gas supply device 6, and the controller 7.

Since the fuel cell 3, the oxidizing gas supply device 6, and the controller 7 are the same as those described above, the description of these components is omitted.

The hydrodesulfurization catalyst 4B is one example of the catalyst 4, which reacts with the oxidizing gas by oxidation. Specifically, when the fuel cell system 100 is operated, the hydrodesulfurization catalyst 4B needs to be kept in a reduced state. Therefore, in the disposal process, when the hydrodesulfurization catalyst 4B is removed to the outside of the container containing the hydrodesulfurization catalyst 4B, the oxidation reaction of the hydrodesulfurization catalyst 4B occurs rapidly. As a result, the hydrodesulfurization catalyst 4B generates a large amount of heat It should be noted that examples of the hydrodesulfurization catalyst 4B include a CuZn-based catalyst having both a function of converting sulfur compounds into hydrogen sulfide and a function of adsorbing the hydrogen sulfide. However, the hydrodesulfurization catalyst 4B is not limited to this type of catalyst. Alternatively, a zinc oxide catalyst alone, a Mo-based catalyst alone, or a combination of a plurality of catalysts may be used as the hydrodesulfurization catalyst 4B.

The shift conversion catalyst 4A may be provided on a fluid passage between the hydrodesulfurization catalyst 4B and the fuel cell 3 although such a configuration is not shown in the drawings.

[Operations]

Hereinafter, operations of the fuel cell system 100 according to Example 8 are described with reference to FIG. 5.

The fuel cell 3 generates electric power by using the hydrogen-containing gas when the fuel cell system 100 is in operation. At the time, the hydrogen-containing gas is added to the hydrodesulfurization catalyst 4B. As a result, sulfur compounds in a raw material supplied to a reformer, not shown, are removed by the hydrodesulfurization catalyst 4B. It should be noted that the hydrogen-containing gas is generated through a reforming reaction of the raw material in the reformer.

The controller 7, before removal of the hydrodesulfurization catalyst 4B to the outside, controls the oxidizing gas supply device 6 to perform the oxidizing process of oxidizing the hydrodesulfurization catalyst 4B. For example, after stopping the fuel cell system 100 from generating electric power, in disposing of, for example, the fuel cell system 100 or hydrogen generation apparatus, the controller 7 may control, during a period until the hydrodesulfurization catalyst 4B is removed to the outside of the container, the oxidizing gas supply device 6 to perform the oxidizing process of oxidizing the hydrodesulfurization catalyst 4B in a state where the hydrogen-containing gas is not flowing over the hydrodesulfurization catalyst 4B, which reacts with the oxidizing gas by oxidation.

According to the above, before removal of the hydrodesulfurization catalyst 4B to the outside, the oxidizing process of oxidizing the hydrodesulfurization catalyst 4B is performed. Therefore, in the disposal process, at the time of removing the hydrodesulfurization catalyst 4B to the outside of the container containing the hydrodesulfurization catalyst 4B, the amount of heat generated due to the oxidation reaction of the hydrodesulfurization catalyst 4B can be reduced compared to conventional art.

Example 9

A fuel cell system according to Example 9 of Embodiment 1 is configured such that, in the fuel cell system according to any one of Embodiment 1 and Examples 1 to 6 of Embodiment 1, the catalyst is a methanation catalyst According to the above configuration, in the disposal process, at the time of removing the methanation catalyst to the outside of the container containing the methanation catalyst, the amount of heat generated due to the oxidation reaction of the methanation catalyst can be reduced compared to conventional art.

Other than the above-described feature, the configuration of the fuel cell system according to Example 9 may be the same as the configuration of the fuel cell system according to any one of Embodiment 1 and Examples 1 to 6 of Embodiment 1.

[Apparatus Configuration]

Figure 6:
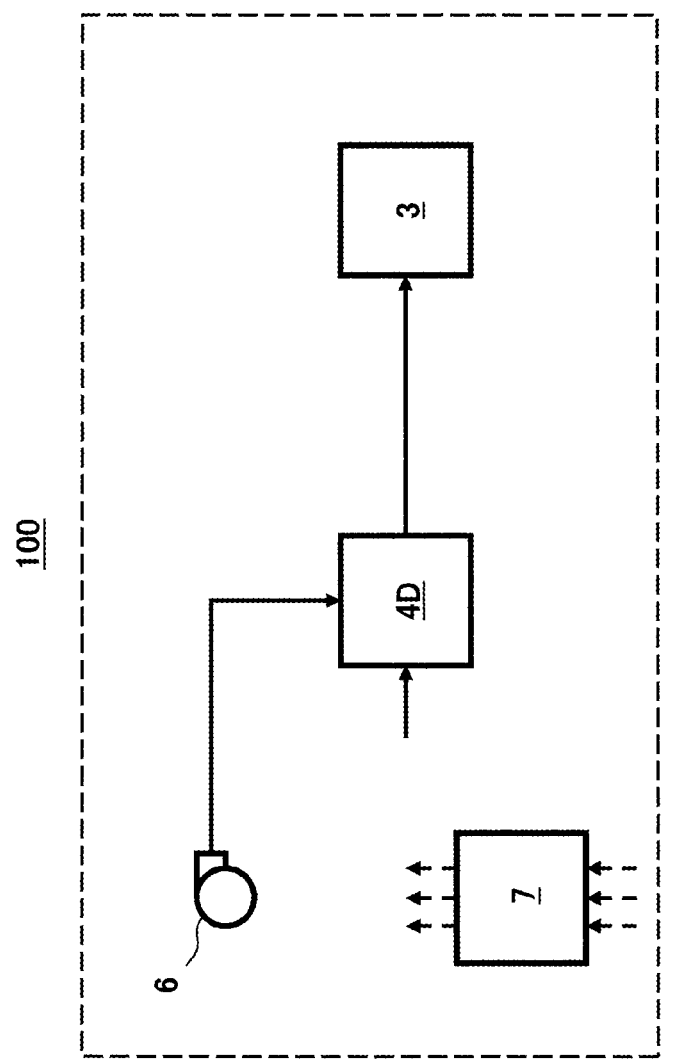
FIG. 6 shows one example of a fuel cell system according to Example 9 of Embodiment 1.

FIG. 6 shows one example of the fuel cell system according to Example 9 of Embodiment 1.

In the example shown in FIG. 6, the fuel cell system 100 according to Example 9 includes the fuel cell 3, a methanation catalyst 4D, the oxidizing gas supply device 6, and the controller 7.

Since the fuel cell 3, the oxidizing gas supply device 6, and the controller 7 are the same as those described above, the description of these components is omitted.

In a case where the fuel cell 3 is, for example, a polymer electrolyte fuel cell, the methanation catalyst 4D is one example of the catalyst 4, which reacts with the oxidizing gas by oxidation. That is, there is a case where Ni is used as the catalyst metal of the methanation catalyst 4D. In this case, when the fuel cell system 100 is operated, the methanation catalyst 4D needs to be kept in a reduced state. Therefore, in the disposal process, when the methanation catalyst 4D is removed to the outside of the container containing the methanation catalyst 4D, the oxidation reaction of the methanation catalyst 4D occurs rapidly. As a result, the methanation catalyst 4D generates a large amount of heat.

[Operations]

Hereinafter, operations of the fuel cell system 100 according to Example 9 are described with reference to FIG. 6.

The fuel cell 3 generates electric power by using the hydrogen-containing gas when the fuel cell system 100 is in operation. At the time, carbon monoxide in the hydrogen-containing gas is reduced owing to a CO methanation reaction proceeding over the methanation catalyst 4D.

The controller 7, before removal of the methanation catalyst 4D to the outside, controls the oxidizing gas supply device 6 to perform the oxidizing process of oxidizing the methanation catalyst 4D. For example, after stopping the fuel cell system 100 from generating electric power, in disposing of, for example, the fuel cell system 100 or hydrogen generation apparatus, the controller 7 may control, during a period until the methanation catalyst 4D is removed to the outside of the container, the oxidizing gas supply device 6 to perform the oxidizing process of oxidizing the methanation catalyst 4D in a state where the hydrogen-containing gas is not flowing over the methanation catalyst 4D, which reacts with the oxidizing gas by oxidation.

According to the above, before removal of the methanation catalyst 4D to the outside, the oxidizing process of oxidizing the methanation catalyst 4D is performed. Therefore, in the disposal process, at the time of removing the methanation catalyst 4D to the outside of the container containing the methanation catalyst 4D, the amount of heat generated due to the oxidation reaction of the methanation catalyst 4D can be reduced compared to conventional art.

Example 10

A fuel cell system according to Example 10 of Embodiment 1 is configured such that, in the fuel cell system according to any one of Embodiment 1 and Examples 1 to 6 of Embodiment 1, the catalyst is a reforming catalyst According to the above configuration, in the disposal process, at the time of removing the reforming catalyst to the outside of the container containing the reforming catalyst, the amount of heat generated due to the oxidation reaction of the reforming catalyst can be reduced compared to conventional art.

Other than the above-described feature, the configuration of the fuel cell system according to Example 10 may be the same as the configuration of the fuel cell system according to any one of Embodiment 1 and Examples 1 to 6 of Embodiment 1.

[Apparatus Configuration]

Figure 7:
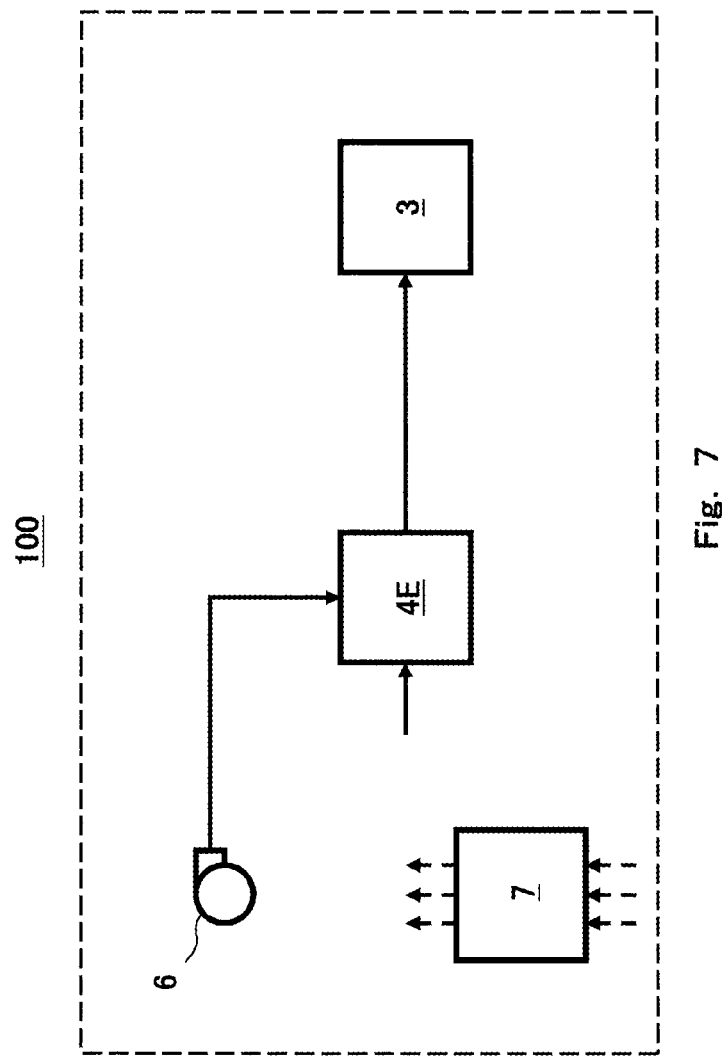
FIG. 7 shows one example of a fuel cell system according to Example 10 of Embodiment 1.

FIG. 7 shows one example of the fuel cell system according to Example 10 of Embodiment 1.

In the example shown in FIG. 7, the fuel cell system 100 according to Example 10 includes the fuel cell 3, a reforming catalyst 4E, the oxidizing gas supply device 6, and the controller 7.

Since the fuel cell 3, the oxidizing gas supply device 6, and the controller 7 are the same as those described above, the description of these components is omitted.

The reforming catalyst 4E is one example of the catalyst 4, which reacts with the oxidizing gas by oxidation. That is, there is a case where Ni, which is a base metal, is used as the catalyst metal of the reforming catalyst 4E. In this case, when the fuel cell system 100 is operated, the reforming catalyst 4E needs to be kept in a reduced state. Therefore, in the disposal process, when the reforming catalyst 4E is removed to the outside of the container containing the reforming catalyst 4E, the oxidation reaction of the reforming catalyst 4E occurs rapidly. As a result, the reforming catalyst 4E generates a large amount of heat.

[Operations]

Hereinafter, operations of the fuel cell system 100 according to Example 10 are described with reference to FIG. 7.

The fuel cell 3 generates electric power by using the hydrogen-containing gas when the fuel cell system 100 is in operation. At the time, the reforming catalyst 4E causes a reforming reaction of a raw material, and thereby the hydrogen-containing gas is generated.

The controller 7, before removal of the reforming catalyst 4E to the outside, controls the oxidizing gas supply device 6 to perform the oxidizing process of oxidizing the hydrodesulfurization catalyst 4B. For example, after stopping the fuel cell system 100 from generating electric power, in disposing of, for example, the fuel cell system 100 or hydrogen generation apparatus, the controller 7 may control, during a period until the reforming catalyst 4E is removed to the outside of the container, the oxidizing gas supply device 6 to perform the oxidizing process of oxidizing the reforming catalyst 4E in a state where the hydrogen-containing gas is not flowing over the reforming catalyst 4E, which reacts with the oxidizing gas by oxidation.

According to the above, before removal of the reforming catalyst 4E to the outside, the oxidizing process of oxidizing the reforming catalyst 4E is performed. Therefore, in the disposal process, at the time of removing the reforming catalyst 4E to the outside of the container containing the reforming catalyst 4E, the amount of heat generated due to the oxidation reaction of the reforming catalyst 4E can be reduced compared to conventional art.

(Variation 1)

A fuel cell system according to Variation 1 of Embodiment 1 is configured such that the fuel cell system according to any one of Embodiment 1 and Examples 1 to 10 of Embodiment 1 includes a CO remover, which is configured to reduce carbon monoxide in the hydrogen-containing gas through an oxidation reaction, and the oxidizing gas supply device supplies the oxidizing gas to the CO remover.

According to the above configuration, the oxidizing process of oxidizing the catalyst can be performed by using the oxidizing gas supply device configured to supply the oxidizing gas to the CO remover. This eliminates the necessity of additionally including another oxidizing gas supply device for use in the oxidizing process, and thus the system configuration is simplified.

Other than the above-described feature, the configuration of the fuel cell system according to Variation 1 may be the same as the configuration of the fuel cell system according to any one of Embodiment 1 and Examples 1 to 10 of Embodiment 1.

[Apparatus Configuration]

Figure 8:
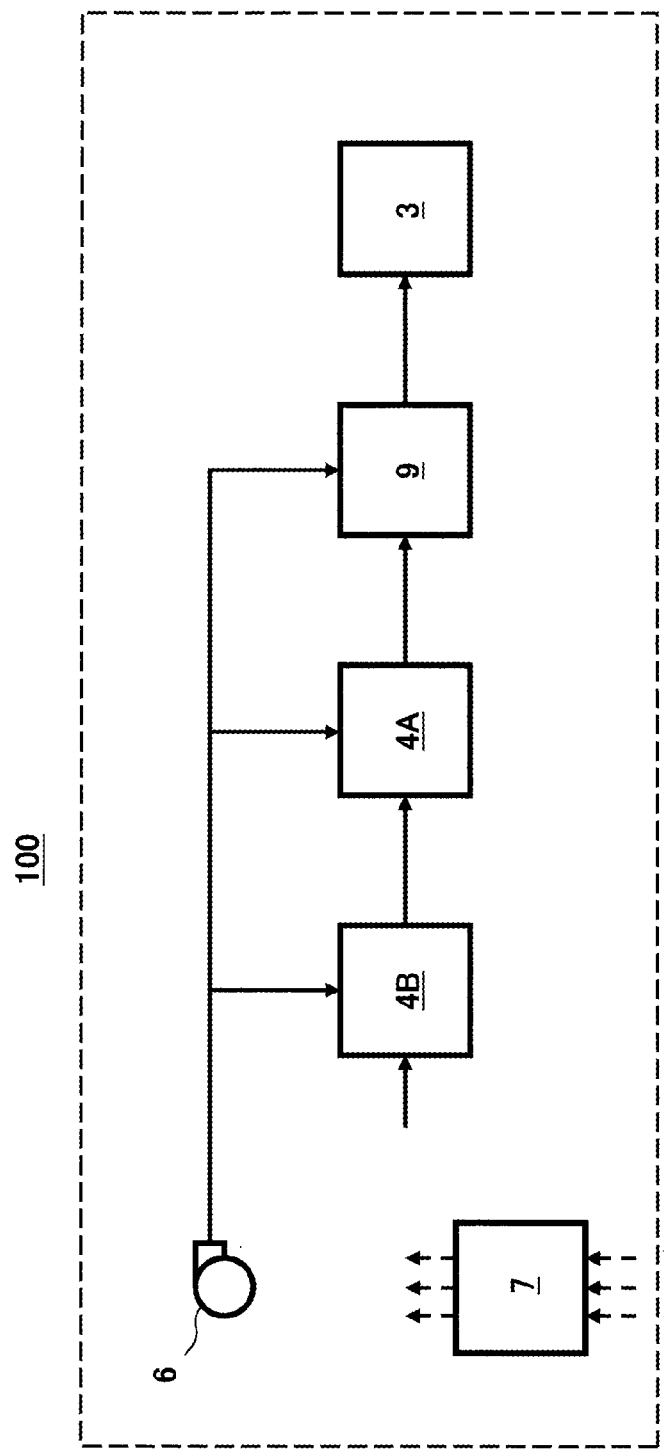
FIG. 8 shows one example of a fuel cell system according to Variation 1 of Embodiment 1.

FIG. 8 shows one example of the fuel cell system according to Variation 1 of Embodiment 1.

In the example shown in FIG. 8, the fuel cell system 100 according to Variation 1 includes the fuel cell 3, the hydrodesulfurization catalyst 4B, the shift conversion catalyst 4A, the oxidizing gas supply device 6, a CO remover 9, and the controller 7.

Since the fuel cell 3, the hydrodesulfurization catalyst 4B, the shift conversion catalyst 4A, the oxidizing gas supply device 6, and the controller 7 are the same as those described above, the description of these components is omitted.

The CO remover 9 reduces carbon monoxide in the hydrogen-containing gas through an oxidation reaction. In the present embodiment, the oxidizing gas supply device 6 supplies the oxidizing gas to the CO remover 9.

[Operations]

Hereinafter, operations of the fuel cell system 100 according to Variation 1 are described with reference to FIG. 8.

The fuel cell 3 generates electric power by using the hydrogen-containing gas when the fuel cell system 100 is in operation.

At the time, the hydrogen-containing gas is added to the hydrodesulfurization catalyst 4B. As a result, sulfur compounds in a raw material supplied to a reformer, not shown, are removed by the hydrodesulfurization catalyst 4B. It should be noted that the hydrogen-containing gas is generated through a reforming reaction of the raw material in the reformer. Then, carbon monoxide in the hydrogen-containing gas is reduced by the shift conversion catalyst 4A and the CO remover 9, and thereafter the hydrogen-containing gas is fed to the fuel cell 3.

The controller 7, before removal of the shift conversion catalyst 4A and the hydrodesulfurization catalyst 4B to the outside of containers containing the respective catalysts, controls the oxidizing gas supply device 6 to perform the oxidizing process of oxidizing the shift conversion catalyst 4A and the hydrodesulfurization catalyst 4B. For example, after stopping the fuel cell system 100 from generating electric power, in disposing of, for example, the fuel cell system 100 or hydrogen generation apparatus, the controller 7 may control, during a period until the shift conversion catalyst 4A and the hydrodesulfurization catalyst 4B are removed to the outside of the containers containing the respective catalysts, the oxidizing gas supply device 6 to perform the oxidizing process of oxidizing the shift conversion catalyst 4A and the hydrodesulfurization catalyst 4B in a state where the hydrogen-containing gas is not flowing over the shift conversion catalyst 4A and the hydrodesulfurization catalyst 4B, both of which react with the oxidizing gas by oxidation.

According to the above, the oxidizing process of oxidizing the shift conversion catalyst 4A and the hydrodesulfurization catalyst 4B can be performed by using the oxidizing gas supply device 6 configured to supply the oxidizing gas to the CO remover 9. This eliminates the necessity of additionally including another oxidizing gas supply device for use in the oxidizing process, and thus the system configuration is simplified.

(Variation 2)

A fuel cell system according to Variation 2 of Embodiment 1 is configured such that, in the fuel cell system according to any one of Embodiment 1 and Examples 1 to 10 of Embodiment 1, the oxidizing gas supply device supplies the oxidizing gas to the fuel cell.

According to the above configuration, the oxidizing process of oxidizing the catalyst can be performed by using the oxidizing gas supply device configured to supply the oxidizing gas to the fuel cell. This eliminates the necessity of additionally including another oxidizing gas supply device for use in the oxidizing process, and thus the system configuration is simplified.

Other than the above-described feature, the configuration of the fuel cell system according to Variation 2 may be the same as the configuration of the fuel cell system according to any one of Embodiment 1 and Examples 1 to 10 of Embodiment 1.

[Apparatus Configuration]

Figure 9:
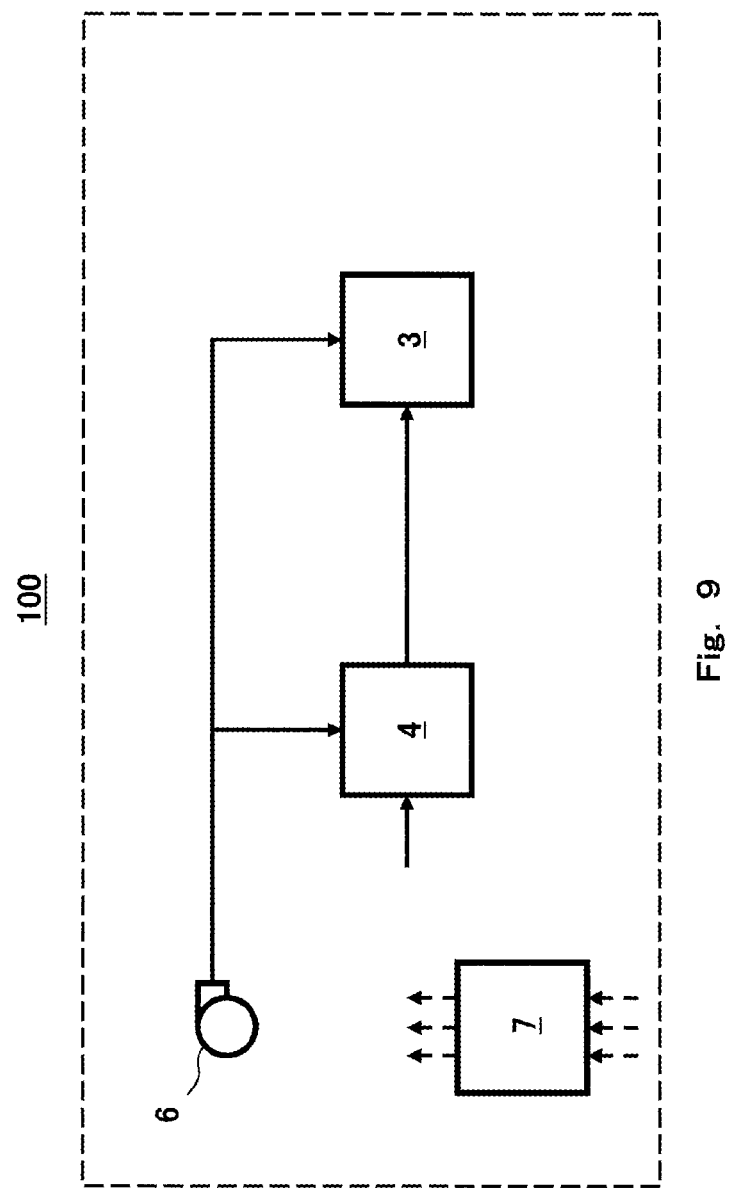
FIG. 9 shows one example of a fuel cell system according to Variation 2 of Embodiment 1.

FIG. 9 shows one example of the fuel cell system according to Variation 2 of Embodiment 1.

In the example shown in FIG. 9, similar to the example of FIG. 1, the fuel cell system 100 according to Variation 2 includes the fuel cell 3, the catalyst 4, the oxidizing gas supply device 6, and the controller 7. The apparatus configuration of the fuel cell system 100 according to Variation 2 is the same as the apparatus configuration described in Embodiment 1, except that in the fuel cell system 100 according to Variation 2, the oxidizing gas supply device 6 supplies the oxidizing gas to the fuel cell 3.

[Operations]

Hereinafter, operations of the fuel cell system 100 according to Variation 2 are described with reference to FIG. 9.

The fuel cell 3 generates electric power by using hydrogen in the hydrogen-containing gas and oxygen in the oxidizing gas from the oxidizing gas supply device 6 when the fuel cell system 100 is in operation. It should be noted that the hydrogen-containing gas is generated through a reforming reaction of a raw material in a reformer, which is not shown.

The controller 7, before removal of the catalyst 4 to the outside of the container containing the catalyst 4, controls the oxidizing gas supply device 6 to perform the oxidizing process of oxidizing the catalyst 4. For example, after stopping the fuel cell system 100 from generating electric power, in disposing of, for example, the fuel cell system 100 or hydrogen generation apparatus, the controller 7 may control, during a period until the catalyst 4 is removed to the outside of the container containing the catalyst 4, the oxidizing gas supply device 6 to perform the oxidizing process of oxidizing the catalyst 4 in a state where the hydrogen-containing gas is not flowing over the catalyst 4, which reacts with the oxidizing gas by oxidation.

According to the above, the oxidizing process of oxidizing the catalyst 4 can be performed by using the oxidizing gas supply device 6 configured to supply the oxidizing gas to the fuel cell 3. This eliminates the necessity of additionally including another oxidizing gas supply device for use in the oxidizing process, and thus the system configuration is simplified.

Control Example 1

A fuel cell system according to Control Example 1 of Embodiment 1 is configured such that, in the fuel cell system according to any one of Embodiment 1, Examples 1 to 10 of Embodiment 1, and Variations 1 and 2 of Embodiment 1, the controller stops the oxidizing gas supply device when a temperature of the catalyst has become higher than or equal to a first threshold.

A method of operating a fuel cell system according to Control Example 1 of Embodiment 1 is such that the method of operating a fuel cell system according to any one of Embodiment 1 and Examples 1, 3, 5, and 6 of Embodiment 1 includes stopping the oxidizing gas supply device when a temperature of the catalyst has become higher than or equal to a first threshold.

According to the above, in the oxidizing process of oxidizing the catalyst, safety is improved compared to a case where the oxidizing process is not stopped when the temperature of the catalyst has become higher than or equal to the first threshold.

Other than the above-described feature, the configuration of the fuel cell system according to Control Example 1 may be the same as the configuration of the fuel cell system according to any one of Embodiment 1, Examples 1 to 10 of Embodiment 1, and Variations 1 and 2 of Embodiment 1.

Other than the above-described feature, the method of operating a fuel cell system according to Control Example 1 may be the same as the method of operating a fuel cell system according to any one of Embodiment 1 and Examples 1, 3, 5, and 6 of Embodiment 1.

[Apparatus Configuration]

The apparatus configuration of the fuel cell system 100 according to Control Example 1 is the same as the apparatus configuration of one of the fuel cell systems described in Embodiment 1, Examples 1 to 10 of Embodiment 1, and Variations 1 and 2 of Embodiment 1. Therefore, the description of the apparatus configuration is omitted.

[Operations]

Figure 10:
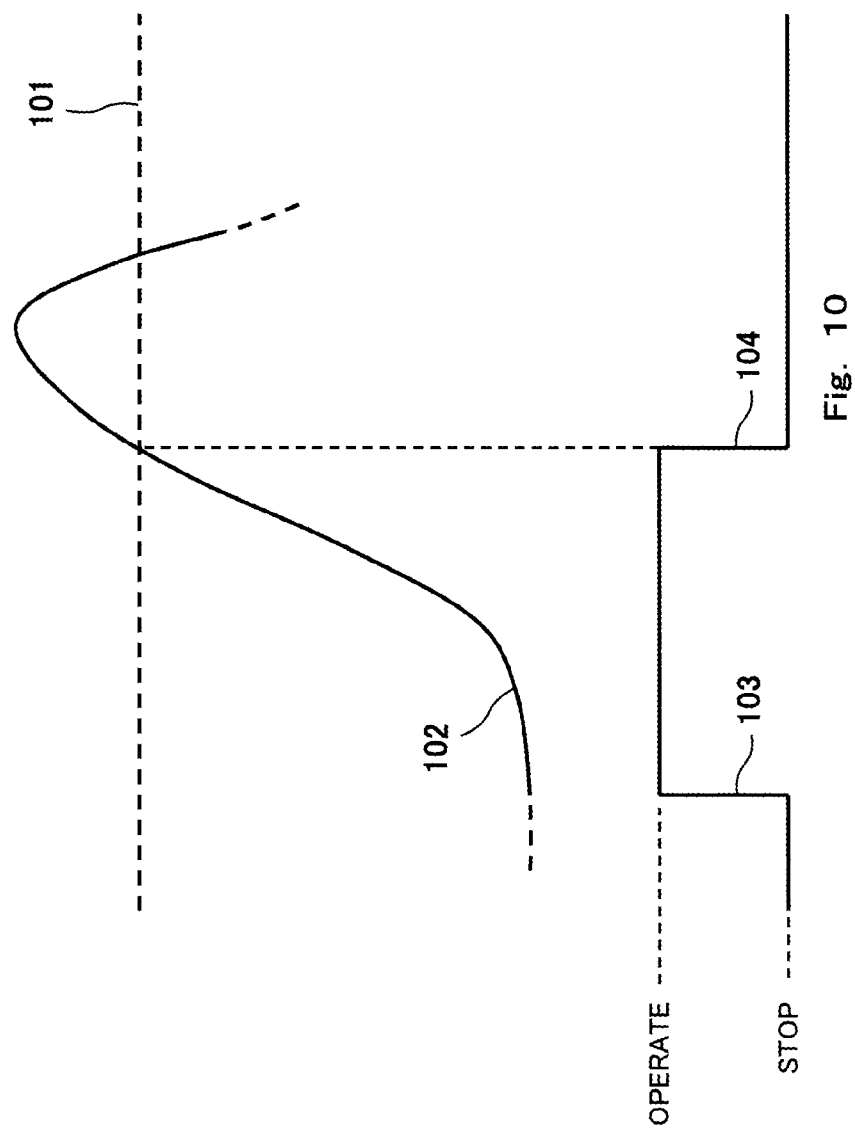
FIG. 10 is a timing chart showing one example of a method of controlling the fuel cell system according to Embodiment 1.

The controller 7 stops the oxidizing gas supply device 6 when the temperature of the catalyst 4 has become higher than or equal to a first threshold 101. Hereinafter, a specific example of the control of the fuel cell system 100 is described with reference to FIG. 10.

First, when the fuel cell system 100 has shifted to an oxidizing process mode, the hydrogen-containing gas stops flowing over the catalyst 4, and the fuel cell 3 stops generating electric power.

Next, the controller 7 performs the oxidizing process of oxidizing the catalyst 4. Specifically, the controller 7 outputs an instruction signal 103 to the oxidizing gas supply device 6 in order to cause the oxidizing gas supply device 6 to operate. In response to the instruction signal 103, the oxidizing gas is supplied to the catalyst 4. As a result, the oxidation reaction of the catalyst 4 occurs, and thereby a catalyst temperature 102 rises.

At the time, in every predetermined sampling period, the controller 7 obtains detection data from a temperature detector (not shown) for use in detection of the catalyst temperature 102.

If the catalyst temperature 102 has become higher than or equal to the first threshold 101, the controller 7 outputs an instruction signal 104 to stop the oxidizing gas supply device 6. The first threshold 101 may be set to 300° C., for example. In response to the instruction signal 104, the supply of the oxidizing gas to the catalyst 4 stops. As a result, the oxidation reaction of the catalyst 4 stops, and the catalyst temperature 102 lowers in a timely manner.

The first threshold 101 herein is set to a suitable temperature. For example, the first threshold 101 is set to a temperature that is lower than the heatproof temperature of the container containing the catalyst 4.

According to the above, in the oxidizing process of oxidizing the catalyst 4, safety is improved compared to a case where the oxidizing process is not stopped when the temperature of the catalyst 4 has become higher than or equal to the first threshold 101.

Although the first threshold 101 is set to 300° C. in the above description, the temperature of 300° C. is merely an example, and the first threshold 101 is not limited to this example.

Control Example 2

A fuel cell system according to Control Example 2 of Embodiment 1 is configured such that, in the fuel cell system according to Control Example 1 of Embodiment 1, the controller causes the oxidizing gas supply device to resume operating when the temperature of the catalyst has become higher than or equal to a second threshold, which is lower than the first threshold.

A method of operating a fuel cell system according to Control Example 2 of Embodiment 1 is such that the method of operating a fuel cell system according to Control Example 1 of Embodiment 1 includes causing the oxidizing gas supply device to resume operating when the temperature of the catalyst has become higher than or equal to a second threshold, which is lower than the first threshold.

According to the above, the amount of heat generated by the catalyst in the oxidizing process can be suppressed, and yet the oxidizing process of oxidizing the catalyst can be suitably continued.

Other than the above-described feature, the configuration of the fuel cell system according to Control Example 2 may be the same as the configuration of the fuel cell system according to Control Example 1 of Embodiment 1.

Other than the above-described feature, the method of operating a fuel cell system according to Control Example 2 may be the same as the method of operating a fuel cell system according to Control Example 1 of Embodiment 1.

[Apparatus Configuration]

The apparatus configuration of the fuel cell system 100 according to Control Example 2 is the same as the apparatus configuration described in one of Embodiment 1, Examples 1 to 10 of Embodiment 1, and Variations 1 and 2 of Embodiment 1. Therefore, the description of the apparatus configuration is omitted.

[Operations]

Figure 11:
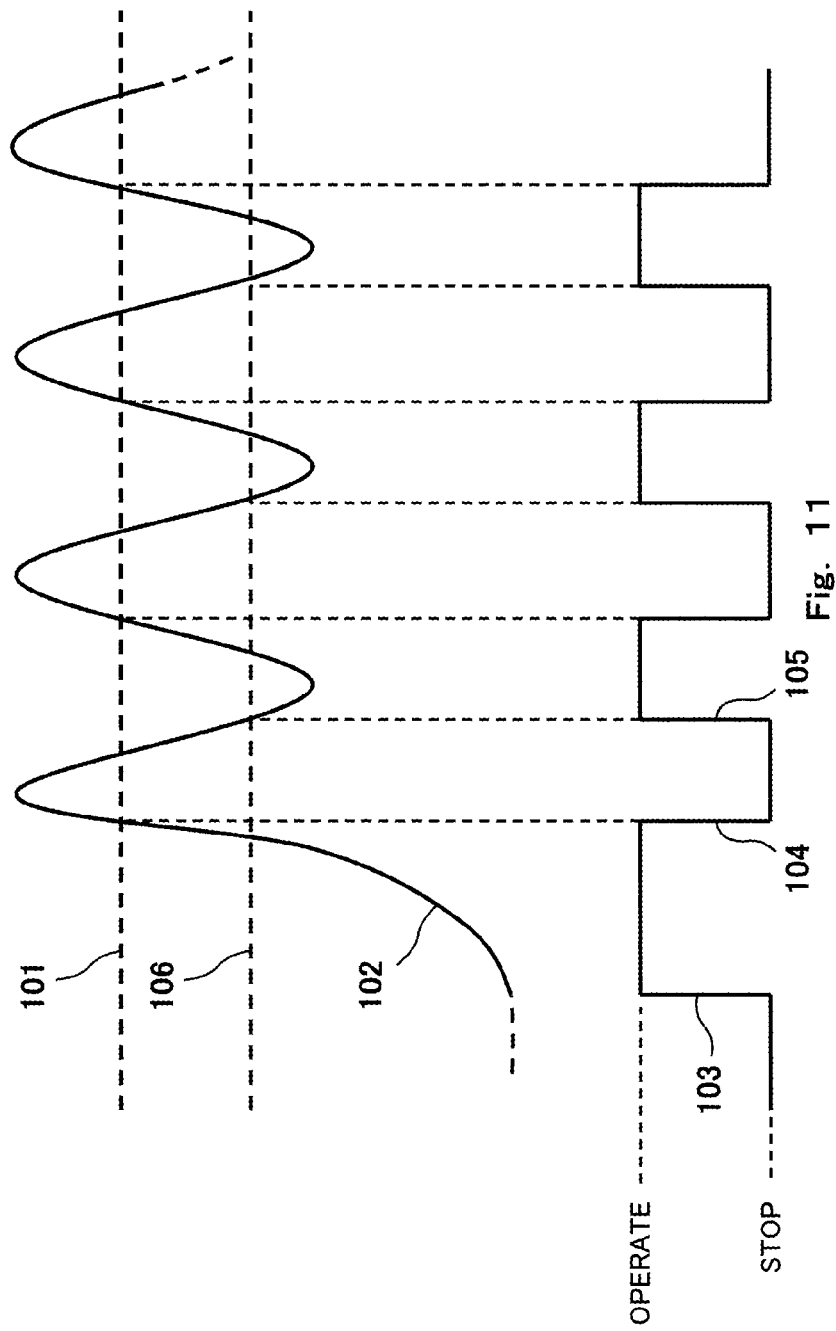
FIG. 11 is a timing chart showing one example of a method of controlling the fuel cell system according to Embodiment 1.

The controller 7 causes the oxidizing gas supply device 6 to resume operating when the temperature of the catalyst 4 has become lower than or equal to a second threshold 106, which is lower than the first threshold 101. Hereinafter, a specific example of the control of the fuel cell system 100 is described with reference to FIG. 11.

First, when the fuel cell system 100 has shifted to the oxidizing process mode, the hydrogen-containing gas stops flowing over the catalyst 4, and the fuel cell 3 stops generating electric power.

Next, the controller 7 performs the oxidizing process of oxidizing the catalyst 4. Specifically, the controller 7 outputs the instruction signal 103 to the oxidizing gas supply device 6 in order to cause the oxidizing gas supply device 6 to operate. In response to the instruction signal 103, the oxidizing gas is supplied to the catalyst 4. As a result, the oxidation reaction of the catalyst 4 occurs, and thereby the catalyst temperature 102 rises.

At the time, in every predetermined sampling period, the controller 7 obtains detection data from the temperature detector (not shown) for use in detection of the catalyst temperature 102.

If the catalyst temperature 102 has become higher than or equal to the first threshold 101, the controller 7 outputs the instruction signal 104 to stop the oxidizing gas supply device 6. The first threshold 101 may be set to 300° C., for example. In response to the instruction signal 104, the supply of the oxidizing gas to the catalyst 4 stops. As a result, the oxidation reaction of the catalyst 4 stops, and the catalyst temperature 102 lowers in a timely manner.

Then, if the catalyst temperature 102 has become lower than or equal to the second threshold 106, which is lower than the first threshold 101, the controller 7 outputs an instruction signal 105 to cause the oxidizing gas supply device 6 to resume operating. The second threshold 106 may be set to 200° C., for example. In response to the instruction signal 105, the supply of the oxidizing gas to the catalyst 4 is resumed. As a result, the oxidation reaction of the catalyst 4 occurs again, and the catalyst temperature 102 rises in a timely manner.

The first threshold 101 and the second threshold 106 herein are set to suitable temperatures. For example, the first threshold 101 is set to a temperature that is lower than the heatproof temperature of the container containing the catalyst 4.

According to the above, the amount of heat generated by the catalyst 4 in the oxidizing process can be suppressed, and yet the oxidizing process of oxidizing the catalyst 4 can be suitably continued.

Although in the above description the first threshold 101 and the second threshold 106 are set to 300° C. and 200° C., respectively, the temperatures of 300° C. and 200° C. are merely examples, and the first threshold 101 and the second threshold 106 are not limited to these examples.

Control Example 3

A fuel cell system according to Control Example 3 of Embodiment 1 is configured such that, in the fuel cell system according to any one of Embodiment 1, Examples 1 to 10 of Embodiment 1, Variations 1 and 2 of Embodiment 1, and Control Examples 1 and 2 of Embodiment 1, the controller stops the oxidizing gas supply device if an upward trend of a temperature of the catalyst ends when the oxidizing gas supply device is in operation.

A method of operating a fuel cell system according to Control Example 3 of Embodiment 1 is such that the method of operating a fuel cell system according to any one of Embodiment 1, Examples 1, 3, 5, and 6 of Embodiment 1, and Control Examples 1 and 2 of Embodiment 1 includes stopping the oxidizing gas supply device if an upward trend of a temperature of the catalyst ends when the oxidizing gas supply device is in operation.

According to the above, the oxidation of the catalyst is caused to progress until the upward trend of the temperature of the catalyst ends. Consequently, the heat generation by the catalyst at the time of removing the catalyst to the outside of the container is suppressed.

Other than the above-described feature, the configuration of the fuel cell system according to Control Example 3 may be the same as the configuration of the fuel cell system according to any one of Embodiment 1, Examples 1 to 10 of Embodiment 1, Variations 1 and 2 of Embodiment 1, and Control Examples 1 and 2 of Embodiment 1.

Other than the above-described feature, the method of operating a fuel cell system according to Control Example 3 may be the same as the method of operating a fuel cell system according to any one of Embodiment 1, Examples 1, 3, 5, and 6 of Embodiment 1, and Control Examples 1 and 2 of Embodiment 1.

[Apparatus Configuration]

The apparatus configuration of the fuel cell system 100 according to Control Example 3 is the same as the apparatus configuration described in one of Embodiment 1, Examples 1 to 10 of Embodiment 1, and Variations 1 and 2 of Embodiment 1. Therefore, the description of the apparatus configuration is omitted.

[Operations]

The controller 7 stops the oxidizing gas supply device 6 if an upward trend of the temperature of the catalyst 4 ends when the oxidizing gas supply device 6 is in operation. Hereinafter, a specific example of the control of the fuel cell system 100 is described with reference to FIG. 12.

First, when the fuel cell system 100 has shifted to the oxidizing process mode, the hydrogen-containing gas stops flowing over the catalyst 4, and the fuel cell 3 stops generating electric power.

Next, the controller 7 performs the oxidizing process of oxidizing the catalyst 4. Specifically, the controller 7 outputs the instruction signal 103 to the oxidizing gas supply device 6 in order to cause the oxidizing gas supply device 6 to operate. In response to the instruction signal 103, the oxidizing gas is supplied to the catalyst 4. As a result, the oxidation reaction of the catalyst 4 occurs, and thereby the catalyst temperature 102 rises.

At the time, in every predetermined sampling period, the controller 7 obtains detection data from the temperature detector (not shown) for use in detection of the catalyst temperature 102.

If the catalyst temperature 102 has become higher than or equal to the first threshold 101, the controller 7 outputs the instruction signal 104 to stop the oxidizing gas supply device 6. The first threshold 101 may be set to 300° C., for example. In response to the instruction signal 104, the supply of the oxidizing gas to the catalyst 4 stops. As a result, the oxidation reaction of the catalyst 4 stops, and the catalyst temperature 102 lowers in a timely manner.

Then, if the catalyst temperature 102 has become lower than or equal to the second threshold 106, which is lower than the first threshold 101, the controller 7 outputs the instruction signal 105 to cause the oxidizing gas supply device 6 to resume operating. The first threshold 101 may be set to 200° C., for example. In response to the instruction signal 105, the supply of the oxidizing gas to the catalyst 4 is resumed. As a result, the oxidation reaction of the catalyst 4 occurs again, and the catalyst temperature 102 rises in a timely manner.

Figure 12:
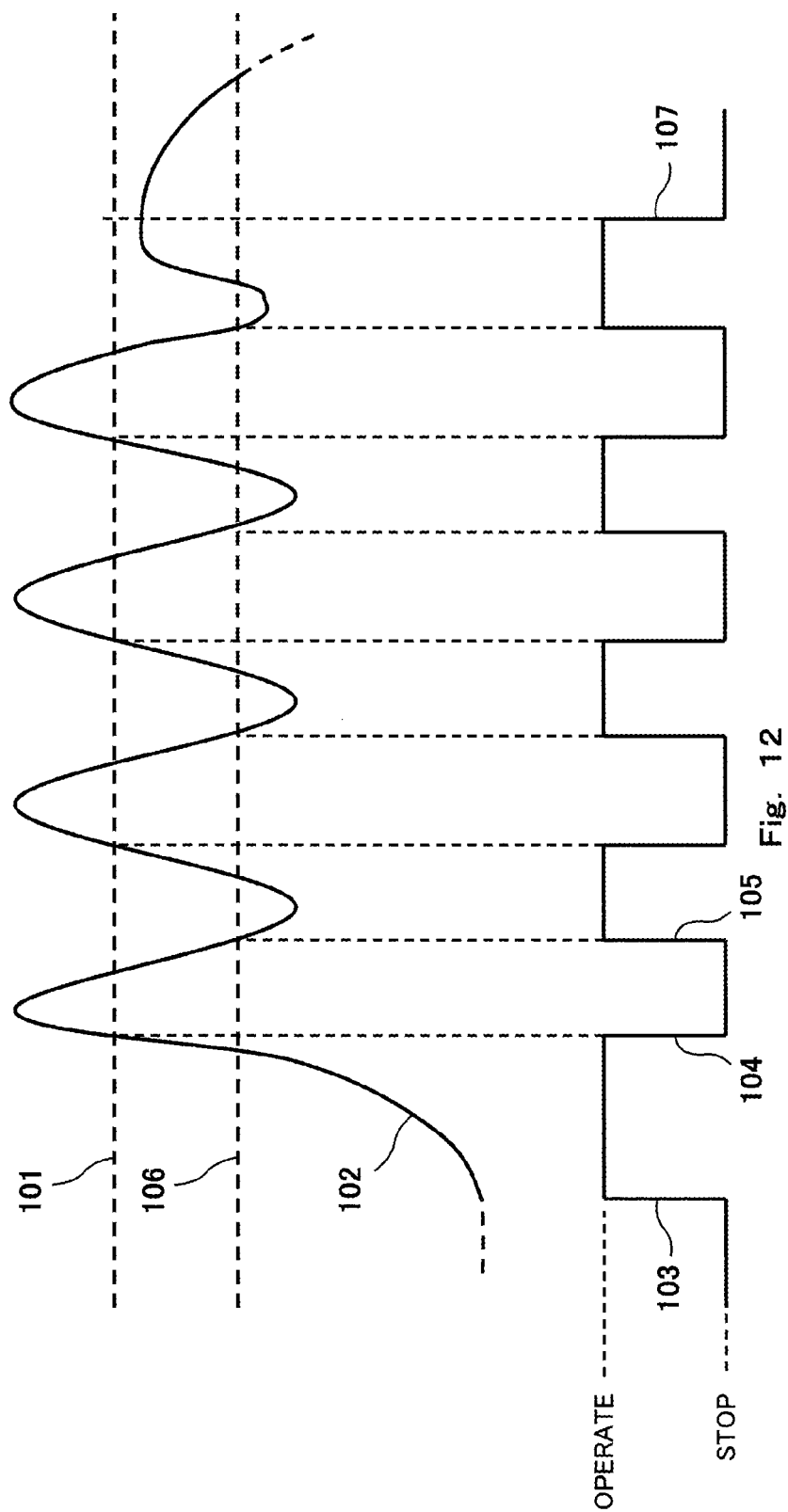
FIG. 12 is a timing chart showing one example of a method of controlling the fuel cell system according to Embodiment 1.

Further, if an upward trend of the catalyst temperature 102 ends when the oxidizing gas supply device 6 is in operation, the controller 7 outputs an instruction signal 107 to stop the oxidizing gas supply device 6. For example, when the profile of the catalyst temperature 102 has become flat as shown in FIG. 12, the controller 7 determines that the upward trend of the catalyst temperature 102 has ended. Accordingly, the controller 7 determines that the oxidizing process of oxidizing the catalyst 4 can be ended.

The first threshold 101 and the second threshold 106 herein are set to suitable temperatures. For example, the first threshold 101 is set to a temperature that is lower than the heatproof temperature of the container containing the catalyst 4.

According to the above, the oxidation of the catalyst 4 is caused to progress until the upward trend of the temperature of the catalyst 4 ends. Consequently, the heat generation by the catalyst 4 at the time of removing the catalyst 4 to the outside of the container is suppressed.

Although in the above description the first threshold 101 and the second threshold 106 are set to 300° C. and 200° C., respectively, the temperatures of 300° C. and 200° C. are merely examples, and the first threshold 101 and the second threshold 106 are not limited to these examples.

In this example, the first threshold 101 and the second threshold 106 are set, and the fuel cell system 100 is configured to perform the oxidizing process repeatedly. However, an alternative configuration may be adopted, in which the oxidizing process is not repeatedly performed. That is, the oxidizing process may be ended if an upward trend of the catalyst temperature 102 of the catalyst 4 ends as a result of performing the first round of the oxidizing process.

Embodiment 2

A fuel cell system according to Embodiment 2 is configured such that the fuel cell system according to any one of Embodiment 1, Examples 1 to 10 of Embodiment 1, Variations 1 and 2 of Embodiment 1, and Control Examples 1 to 3 of Embodiment 1 includes: a branch passage branching off from a fluid passage upstream of the catalyst, the branch passage being configured to open to an atmosphere; a first switch provided on the branch passage; and a second switch provided on a fluid passage downstream of the catalyst. In the fuel cell system according to Embodiment 2, the oxidizing gas supply device is configured to supply the oxidizing gas to a fluid passage extending from the catalyst to the second switch, and the controller opens the first switch and closes the second switch in the oxidizing process.

A method of operating a fuel cell system according to Embodiment 2 is such that the method of operating a fuel cell system according to any one of Embodiment 1, Examples 1, 3, 5, and 6 of Embodiment 1, and Control Examples 1 to 3 of Embodiment 1 includes: in the oxidizing process, opening a first switch provided on a branch passage, the branch passage branching off from a fluid passage upstream of the catalyst, the branch passage being configured to open to an atmosphere; closing a second switch provided on a fluid passage downstream of the catalyst; and supplying, by the oxidizing gas supply device, the oxidizing gas to a fluid passage extending from the catalyst to the second switch.

According to the above, the oxidizing process of oxidizing the catalyst can be performed. Therefore, in the disposal process, at the time of removing the catalyst to the outside of the container containing the catalyst, the amount of heat generated due to the oxidation reaction of the catalyst can be reduced compared to conventional art.

Other than the above-described feature, the configuration of the fuel cell system according to Embodiment 2 may be the same as the configuration of the fuel cell system according to any one of Embodiment 1, Examples 1 to 10 of Embodiment 1, Variations 1 and 2 of Embodiment 1, and Control Examples 1 to 3 of Embodiment 1.

Other than the above-described feature, the method of operating a fuel cell system according to Embodiment 2 may be the same as the method of operating a fuel cell system according to any one of Embodiment 1, Examples 1, 3, 5, and 6 of Embodiment 1, and Control Examples 1 to 3 of Embodiment 1.

[Apparatus Configuration]

Figure 13:
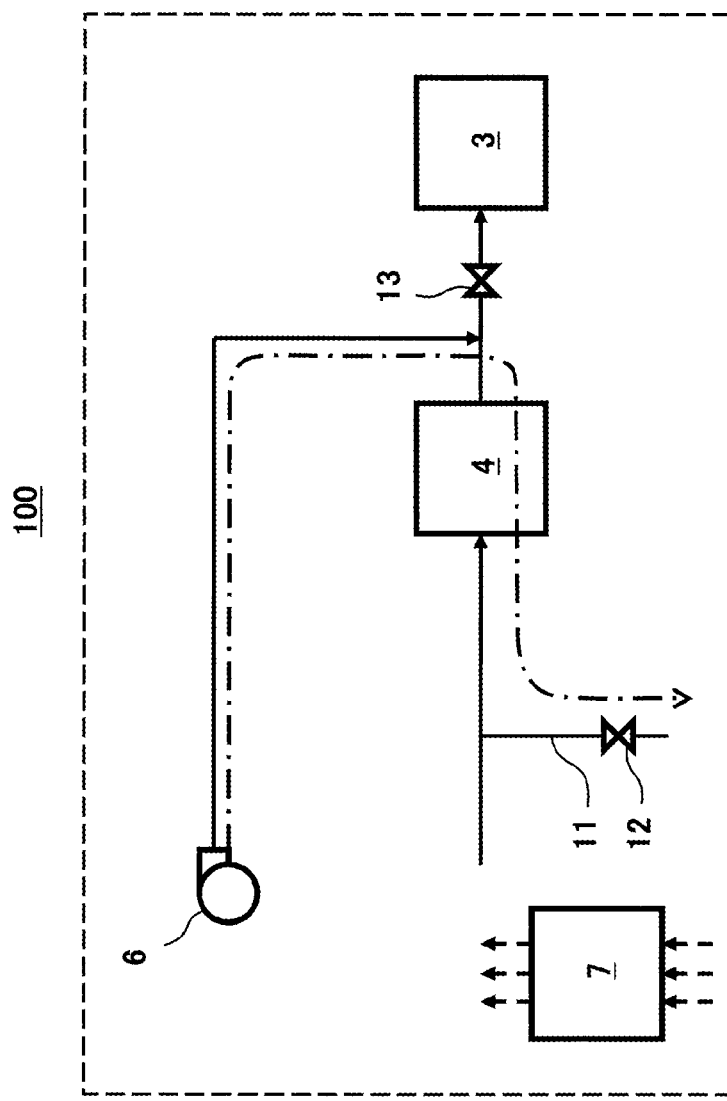
FIG. 13 shows one example of a fuel cell system according to Embodiment 2.

FIG. 13 shows one example of the fuel cell system according to Embodiment 2.

In the example shown in FIG. 13, the fuel cell system 100 according to the present embodiment includes the fuel cell 3, the catalyst 4, the oxidizing gas supply device 6, a branch passage 11, a first switch 12, a second switch 13, and the controller 7.

Since the fuel cell 3, the catalyst 4, and the oxidizing gas supply device 6 are the same as those described above, the description of these components is omitted.

The branch passage 11 branches off from a fluid passage upstream of the catalyst 4, and is configured to open to the atmosphere. It should be noted that the upstream end of the branch passage 11 may be connected to any portion of a fluid passage, so long as the fluid passage is positioned upstream of the catalyst 4.

The first switch 12 is provided on the branch passage 11. By opening the first switch 12, the branch passage 11 opens to the atmosphere. The first switch 12 may be configured in any form, so long as the first switch 12 is configured to open and close the branch passage 11. The first switch 12 may be an on-off valve, for example.

The second switch 13 is provided on a fluid passage downstream of the catalyst 4. The second switch 13 may be provided at any position downstream of the catalyst 4. For example, as shown in FIG. 13, the second switch 13 may be provided on a fluid passage between the catalyst 4 and the fuel cell 3, or may be provided downstream of the fuel cell 3.

The second switch 13 may be configured in any form, so long as the second switch 13 is configured to open and close the fluid passage downstream of the catalyst 4. The second switch 13 may be an on-off valve, for example.

[Operations]

Hereinafter, operations of the fuel cell system 100 according to the present embodiment are described with reference to FIG. 13.

The fuel cell 3 generates electric power by using the hydrogen-containing gas when the fuel cell system 100 is in operation.

In the oxidizing process, the oxidizing gas supply device 6 supplies the oxidizing gas to a fluid passage extending from the catalyst 4 to the second switch 13. Accordingly, before removal of the catalyst 4 to the outside of the container containing the catalyst 4, the controller 7 controls the oxidizing gas supply device 6 to operate, and thereby the oxidizing process of oxidizing the catalyst 4 can be performed. For example, after stopping the fuel cell system 100 from generating electric power, in disposing of, for example, the fuel cell system 100 or hydrogen generation apparatus, the controller 7 may control, during a period until the catalyst 4 is removed to the outside of the container, the oxidizing gas supply device 6 to perform the oxidizing process of oxidizing the catalyst 4 in a state where the hydrogen-containing gas is not flowing over the catalyst 4, which reacts with the oxidizing gas by oxidation.

In the present embodiment, in the oxidizing process, the controller 7 causes the oxidizing gas supply device 6 to operate, opens the first switch 12, and closes the second switch 13. As a result, as indicated by a dashed-dotted line in FIG. 13, the oxidizing gas is supplied to the fluid passage extending from the catalyst 4 to the second switch 13, subsequently flows through the catalyst 4 and the branch passage 11 in this order, and is then discharged to the outside. In this manner, the oxidizing gas is supplied to the catalyst 4, and the catalyst 4 is oxidized in the oxidizing process. That is, the feature of the present embodiment is that the oxidizing gas supply device 6, the branch passage 11, and the first switch 12 are utilized in the oxidizing process of oxidizing the catalyst 4.

At the time, in every predetermined sampling period, the controller 7 may obtain detection data from a temperature detector for use in detection of the catalyst temperature.

Temperature control in the oxidizing process of oxidizing the catalyst 4 may be performed in the same manner as that described above in any one of Control Examples 1 to 3.

Thus, in the present embodiment, the oxidizing process of oxidizing the catalyst 4 can be performed by guiding the oxidizing gas through the catalyst 4 to the branch passage 11. Therefore, in the disposal process, at the time of removing the catalyst 4 to the outside of the container containing the catalyst 4, the amount of heat generated due to the oxidation reaction of the catalyst 4 can be reduced compared to conventional art.

Example

A fuel cell system according to Example of Embodiment 2 is configured such that, in the fuel cell system according to Embodiment 2, the catalyst is at least a shift conversion catalyst, and the oxidizing gas supply device supplies the oxidizing gas to a CO remover, which is configured to reduce carbon monoxide in the hydrogen-containing gas through an oxidation reaction.

According to the above configuration, the oxidizing process of oxidizing the shift conversion catalyst can be performed. Therefore, in the disposal process, at the time of removing the shift conversion catalyst to the outside of the container containing the shift conversion catalyst, the amount of heat generated due to the oxidation reaction of the shift conversion catalyst can be reduced compared to conventional art.

In addition, the oxidizing process of oxidizing the catalyst can be performed by using the oxidizing gas supply device configured to supply the oxidizing gas to the CO remover. This eliminates the necessity of additionally including another oxidizing gas supply device for use in the oxidizing process, and thus the system configuration is simplified.

Other than the above-described feature, the configuration of the fuel cell system according to Example of Embodiment 2 may be the same as the configuration of the fuel cell system according to Embodiment 2.

[Apparatus Configuration]

Figure 14:
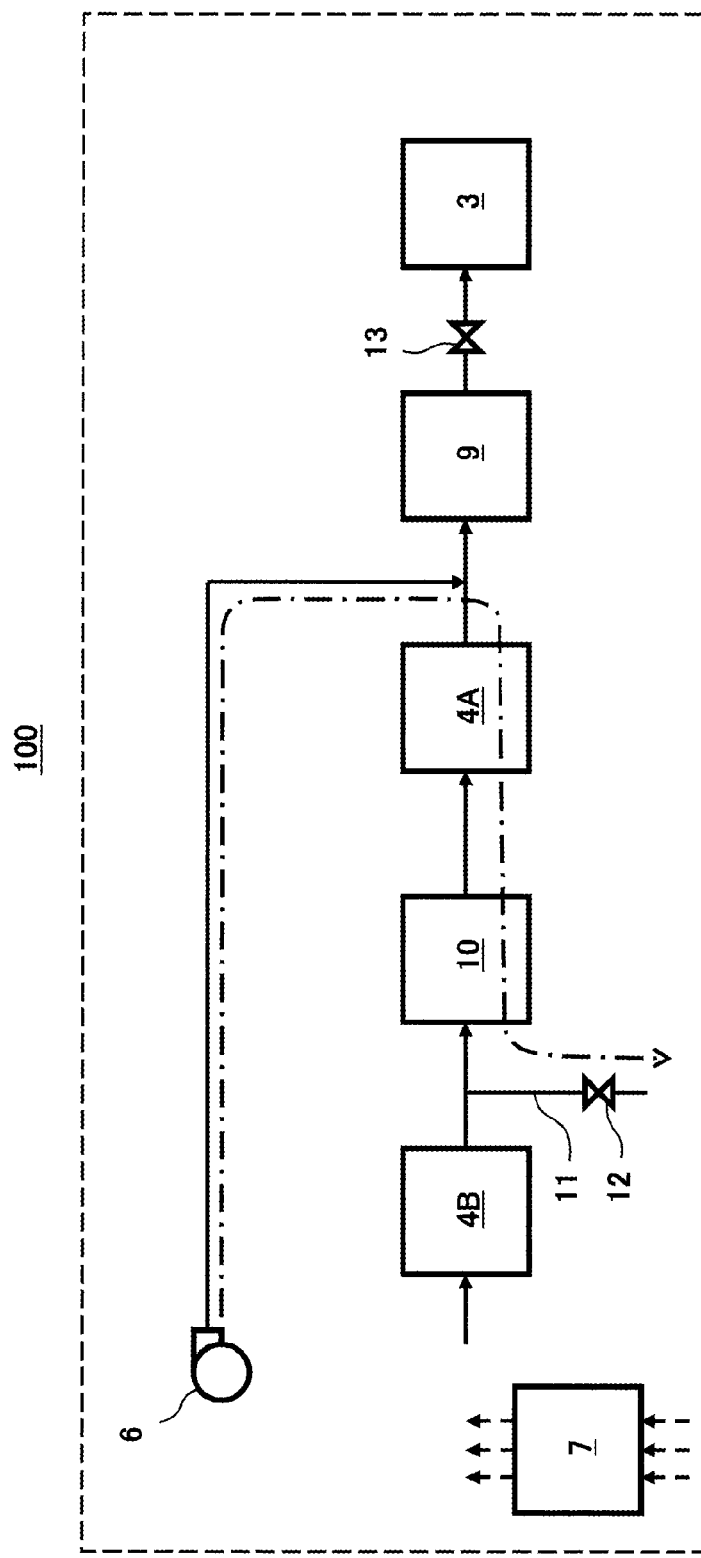
FIG. 14 shows one example of a fuel cell system according to Example of Embodiment 2.

FIG. 14 shows one example of the fuel cell system according to Example of Embodiment 2.

In the example shown in FIG. 14, the fuel cell system 100 according to Example of Embodiment 2 includes the fuel cell 3, the shift conversion catalyst 4A, the hydrodesulfurization catalyst 4B, the oxidizing gas supply device 6, the CO remover 9, a reformer 10, the branch passage 11, the first switch 12, the second switch 13, and the controller 7.

The apparatus configuration of the fuel cell system 100 according to Example of Embodiment 2 is the same as the apparatus configuration described in Embodiment 2 except the following points: in the fuel cell system 100 according to Example of Embodiment 2, the catalyst 4 is at least the shift conversion catalyst 4A; the hydrodesulfurization catalyst 4B, the reformer 10, and the CO remover 9 are included; and the oxidizing gas supply device 6 supplies the oxidizing gas to the CO remover 9, which is configured to reduce carbon monoxide in the hydrogen-containing gas through an oxidation reaction.

The reformer 10 generates the hydrogen-containing gas by using a raw material. Specifically, the reformer 10 causes a reforming reaction of the raw material, thereby generating the hydrogen-containing gas. The reforming reaction may be any type of reforming reaction. Examples of the reforming reaction include a steam reforming reaction, an autothermal reaction, and a partial oxidation reaction. The fuel cell system 100 includes, as necessary, devices required for the reforming reaction although they are not shown in FIG. 14. For example, if the reforming reaction is a steam reforming reaction, the fuel cell system 100 includes: a combustor configured to heat the reformer; an evaporator configured to generate steam; and a water supply device configured to supply water to the evaporator. If the reforming reaction is an autothermal reaction, the fuel cell system 100 further includes an air supply device configured to supply air to the reformer.

It should be noted that, as previously described, the raw material is, for example, an organic compound comprised of at least carbon and hydrogen, such as city gas or natural gas both containing methane as a main component, or LPG Although in this example the fuel cell system 100 includes the shift conversion catalyst 4A and the CO remover 9, it is not essential for the fuel cell system 100 to include these components. In a case where the fuel cell system 100 does not include the shift conversion catalyst 4A and the CO remover 9, the reforming catalyst in the reformer 10 is the catalyst that needs to be oxidized in the oxidizing process.

As in this example, the branch passage 11 may branch off from a fluid passage upstream of the reformer 10, and may be configured to open to the atmosphere. In this case, the upstream end of the branch passage 11 may be connected to any portion of a fluid passage, so long as the fluid passage is positioned upstream of the reformer 10. For instance, as in this example, the upstream end of the branch passage 11 may be connected to a fluid passage between the hydrodesulfurization catalyst 4B and the reformer 10, or may be connected to a fluid passage upstream of the hydrodesulfurization catalyst 4B.

It should be noted that the branch passage 11 is utilized not only for discharging exhaust gas to the atmosphere in the oxidizing process, but also for other purposes. For example, in a case where the pressure in the reformer 10 becomes high, the first switch 12 may be opened to release the pressure in the reformer 10 to the atmosphere, and thereby the inside of the reformer 10 may be depressurized. In a case where the branch passage 11 is in communication with an evaporator, the first switch 12 may be opened to utilize the branch passage 11 to drain water in the evaporator to the outside of the fuel cell system 100.

In addition, a desulfurization catalyst different from the hydrodesulfurization catalyst 4B may be used. Specific examples of the different desulfurization catalyst include a normal-temperature desulfurization catalyst and a high-temperature desulfurization catalyst. The normal-temperature desulfurization catalyst is a catalyst capable of desulfurization by physical adsorption at normal temperatures. The high-temperature desulfurization catalyst is a catalyst capable of desulfurization by physical adsorption at higher temperatures (e.g., 200° C.) than the normal temperatures.

Although in this example the fuel cell system 100 includes the hydrodesulfurization catalyst 4B, the fuel cell system 100 may adopt an alternative configuration that includes no desulfurization catalyst such as the hydrodesulfurization catalyst 4B.

As in this example, the second switch 13 may be provided on a fluid passage between the fuel cell 3 and the CO remover 9 downstream of the shift conversion catalyst 4A, which is one example of the catalyst 4, or may be provided downstream of the fuel cell 3. When the second switch 13 is opened, the hydrogen-containing gas is supplied from the reformer 10 to the fuel cell 3, whereas when the second switch 13 is closed, the supply of the hydrogen-containing gas to the fuel cell 3 is blocked.

[Operations]

Hereinafter, operations of the fuel cell system 100 according to Example of Embodiment 2 are described with reference to FIG. 14.

The fuel cell 3 generates electric power by using the hydrogen-containing gas when the fuel cell system 100 is in operation.

At the time, the hydrogen-containing gas is added to the hydrodesulfurization catalyst 4B. As a result, sulfur compounds in the raw material supplied to the reformer 10 are removed by the hydrodesulfurization catalyst 4B. It should be noted that the hydrogen-containing gas is generated through the reforming reaction of the raw material in the reformer 10. Then, the oxidizing gas supply device 6 supplies the oxidizing gas to the CO remover 9, which is configured to reduce carbon monoxide in the hydrogen-containing gas through an oxidation reaction. Accordingly, carbon monoxide in the hydrogen-containing gas is reduced by the shift conversion catalyst 4A and the CO remover 9, and then the hydrogen-containing gas is fed to the fuel cell 3.

At the time of stopping the fuel cell system 100 from operating, the second switch 13 is closed to block the communication between the reformer 10 and the atmosphere. That is, the reformer 10 is sealed up. When the reformer 10 is sealed up, there is a case where the pressure in the reformer 10 becomes high due to evaporation of residual water. In this case, the first switch 12 is opened to temporarily release the pressure in the reformer 10 to the atmosphere, and thereby the inside of the reformer 10 is depressurized.

In the oxidizing process, the oxidizing gas supply device 6 supplies the oxidizing gas to a fluid passage extending from the reformer 10 to the second switch 13. Accordingly, before removal of the shift conversion catalyst 4A to the outside of the container containing the shift conversion catalyst 4A, the controller 7 controls the oxidizing gas supply device 6 to operate, and thereby the oxidizing process of oxidizing the shift conversion catalyst 4A can be performed. For example, after stopping the fuel cell system 100 from generating electric power, in disposing of, for example, the fuel cell system 100 or hydrogen generation apparatus, the controller 7 may control, during a period until the shift conversion catalyst 4A is removed to the outside of the container, the oxidizing gas supply device 6 to perform the oxidizing process of oxidizing the shift conversion catalyst 4A in a state where the hydrogen-containing gas is not flowing over the shift conversion catalyst 4A, which reacts with the oxidizing gas by oxidation.

In Example of Embodiment 2, in the oxidizing process, the controller 7 causes the oxidizing gas supply device 6 to operate, opens the first switch 12, and closes the second switch 13. As a result, as indicated by a dashed-dotted line in FIG. 14, the oxidizing gas is supplied to the fluid passage extending from the reformer 10 to the second switch 13, subsequently flows through the shift conversion catalyst 4A, the reformer 10, and the branch passage 11 in this order, and is then discharged to the outside. In this manner, the oxidizing gas is supplied to the shift conversion catalyst 4A, and the shift conversion catalyst 4A is oxidized in the oxidizing process.

It should be noted that if the reforming catalyst in the reformer 10 is a catalyst that reacts with the oxidizing gas by oxidation, then not only the shift conversion catalyst 4A but also the reforming catalyst is oxidized in the oxidizing process. That is, the feature of Example of Embodiment 2 is that the oxidizing gas supply device 6, the branch passage 11, and the first switch 12 are utilized in the oxidizing process of oxidizing the shift conversion catalyst 4.

In the case of adopting a configuration when the upstream end of the branch passage is connected to a fluid passage upstream of the hydrodesulfurization catalyst 4B, the oxidizing gas flows through the shift conversion catalyst 4A, the reformer 10, the hydrodesulfurization catalyst 4B, and the branch passage in this order, and is then discharged to the outside. In this manner, the oxidizing gas is supplied to the shift conversion catalyst 4A and the hydrodesulfurization catalyst 4B, and these catalysts are oxidized in the oxidizing process. That is, in this case, the feature of Example of Embodiment 2 is that the oxidizing gas supply device 6, the branch passage 11, and the first switch 12 are utilized in the oxidizing process of oxidizing the shift conversion catalyst 4A and the hydrodesulfurization catalyst 4B.

At the time, in every predetermined sampling period, the controller 7 may obtain detection data from a temperature detector for use in detection of the temperature of the shift conversion catalyst. Similarly, in every predetermined sampling period, the controller 7 may obtain detection data from a temperature detector for use in detection of the temperature of the hydrodesulfurization catalyst.

Temperature control in the oxidizing process of oxidizing the shift conversion catalyst 4A and the hydrodesulfurization catalyst 4B may be performed in the same manner as that described above in any one of Control Examples 1 to 3.

Thus, in Example of Embodiment 2, the oxidizing process of oxidizing at least the shift conversion catalyst 4A can be performed by guiding the oxidizing gas through the reformer 10 to the branch passage 11. Therefore, in the disposal process, at the time of removing the shift conversion catalyst 4A to the outside of the container containing the shift conversion catalyst 4A, the amount of heat generated due to the oxidation reaction of the shift conversion catalyst 4A can be reduced compared to conventional art. In the case of adopting a configuration where the upstream end of the branch passage is connected to a fluid passage upstream of the hydrodesulfurization catalyst 4B, the oxidizing process of oxidizing the shift conversion catalyst 4A and the hydrodesulfurization catalyst 4B can be performed by guiding the oxidizing gas through the hydrodesulfurization catalyst 4B to the branch passage. Therefore, in the disposal process, at the time of removing the shift conversion catalyst 4A and the hydrodesulfurization catalyst 4B to the outside of containers containing the respective catalysts, the amount of heat generated due to the oxidation reactions of the shift conversion catalyst 4A and the hydrodesulfurization catalyst 4B can be reduced compared to conventional art.

Embodiment 3

A fuel cell system according to Embodiment 3 is configured such that the fuel cell system according to any one of Embodiment 1, Examples 1 to 10 of Embodiment 1, Variations 1 and 2 of Embodiment 1, Control Examples 1 to 3 of Embodiment 1, Embodiment 2, and Example of Embodiment 2 includes an operating unit operated by an operator, and the controller performs the oxidizing process when the operator has performed a manual input to the operating unit A method of operating a fuel cell system according to Embodiment 3 is such that the method of operating a fuel cell system according to any one of Embodiment 1, Examples 1, 3, 5, and 6 of Embodiment 1, Control Examples 1 to 3 of Embodiment 1, and Embodiment 2 includes performing the oxidizing process when an operator has performed a manual input to an operating unit According to the above, the oxidizing process of oxidizing the catalyst can be timely started by the operator's manual input to the operating unit Other than the above-described feature, the configuration of the fuel cell system according to Embodiment 3 may be the same as the configuration of the fuel cell system according to any one of Embodiment 1, Examples 1 to 10 of Embodiment 1, Variations 1 and 2 of Embodiment 1, Control Examples 1 to 3 of Embodiment 1, Embodiment 2, and Example of Embodiment 2.

Other than the above-described feature, the method of operating a fuel cell system according to Embodiment 3 may be the same as the method of operating a fuel cell system according to any one of Embodiment 1, Examples 1, 3, 5, and 6 of Embodiment 1, Control Examples 1 to 3 of Embodiment 1, and Embodiment 2.

[Apparatus Configuration]

The apparatus configuration of the fuel cell system 100 according to Embodiment 3 is the same as any one of the apparatus configurations described in Embodiment 1, Examples 1 to 10 of Embodiment 1, Variations 1 and 2 of Embodiment 1, Control Examples 1 to 3 of Embodiment 1, Embodiment 2, and Example of Embodiment 2, except that the fuel cell system 100 according to Embodiment 3 includes the operating unit. Therefore, the description of the apparatus configuration of the fuel cell system 100 according to Embodiment 3 is omitted.

[Operations]

Figure 15:
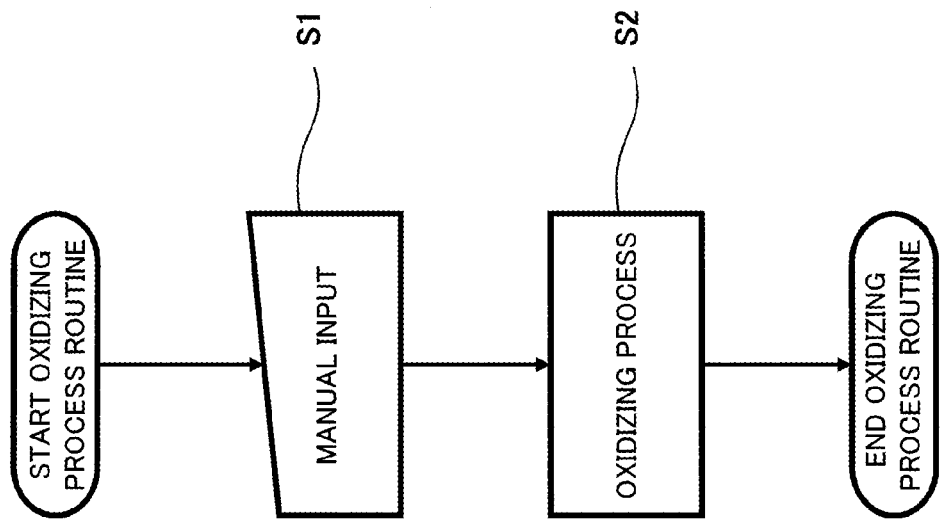
FIG. 15 is a flowchart showing one example of operations of a fuel cell system according to Embodiment 3.

FIG. 15 is a flowchart showing one example of operations of the fuel cell system according to Embodiment 3.

In the present embodiment, after the controller 7 has stopped the fuel cell system 100 from generating electric power, in disposing of, for example, the fuel cell system 100 or hydrogen generation apparatus, during a period until the catalyst 4 is removed to the outside of the container, an operator performs a manual input to the operating unit as shown in FIG. 15 (step S1). In response, the controller 7 performs the oxidizing process of oxidizing the catalyst 4 (step S2). Alternatively, the controller 7 may perform the oxidizing process of oxidizing the catalyst 4 not when the operator has performed a manual input to the operating unit in step S1, but when a control program of the controller 7 has been rewritten. For example, the oxidizing process of oxidizing the catalyst 4 may be started when software for the oxidizing process of oxidizing the catalyst 4 has been installed in the controller 7. The software may be stored in a storage medium, or may be installed via a network.

It should be noted that temperature control in the oxidizing process of oxidizing the catalyst 4 may be performed in the same manner as that described above in any one of Control Examples 1 to 3.

According to the above, the oxidizing process of oxidizing the catalyst 4 can be timely performed in response to the operator's manual input to the operating unit Embodiment 4

A fuel cell system according to Embodiment 4 is configured such that the fuel cell system according to any one of Embodiment 1, Examples 1 to 10 of Embodiment 1, Variations 1 and 2 of Embodiment 1, Control Examples 1 to 3 of Embodiment 1, Embodiment 2, Example of Embodiment 2, and Embodiment 3 includes a receiver configured to externally receive a command to perform the oxidizing process, and the controller performs the oxidizing process when the receiver has received the command to perform the oxidizing process.

A method of operating a fuel cell system according to Embodiment 4 is such that the method of operating a fuel cell system according to any one of Embodiment 1, Examples 1, 3, 5, and 6 of Embodiment 1, Control Examples 1 to 3 of Embodiment 1, Embodiment 2, and Embodiment 3 includes performing the oxidizing process when having externally received a command to perform the oxidizing process.

According to the above, the command to perform the oxidizing process, which is received by the receiver, allows the oxidizing process of oxidizing the catalyst to start in a timely manner.

Other than the above-described feature, the configuration of the fuel cell system according to Embodiment 4 may be the same as the configuration of the fuel cell system according to any one of Embodiment 1, Examples 1 to 10 of Embodiment 1, Variations 1 and 2 of Embodiment 1, Control Examples 1 to 3 of Embodiment 1, Embodiment 2, Example of Embodiment 2, and Embodiment 3.

Other than the above-described feature, the method of operating a fuel cell system according to Embodiment 4 may be the same as the method of operating a fuel cell system according to any one of Embodiment 1, Examples 1, 3, 5, and 6 of Embodiment 1, Control Examples 1 to 3 of Embodiment 1, Embodiment 2, and Embodiment 3.

[Apparatus Configuration]

Figure 16:
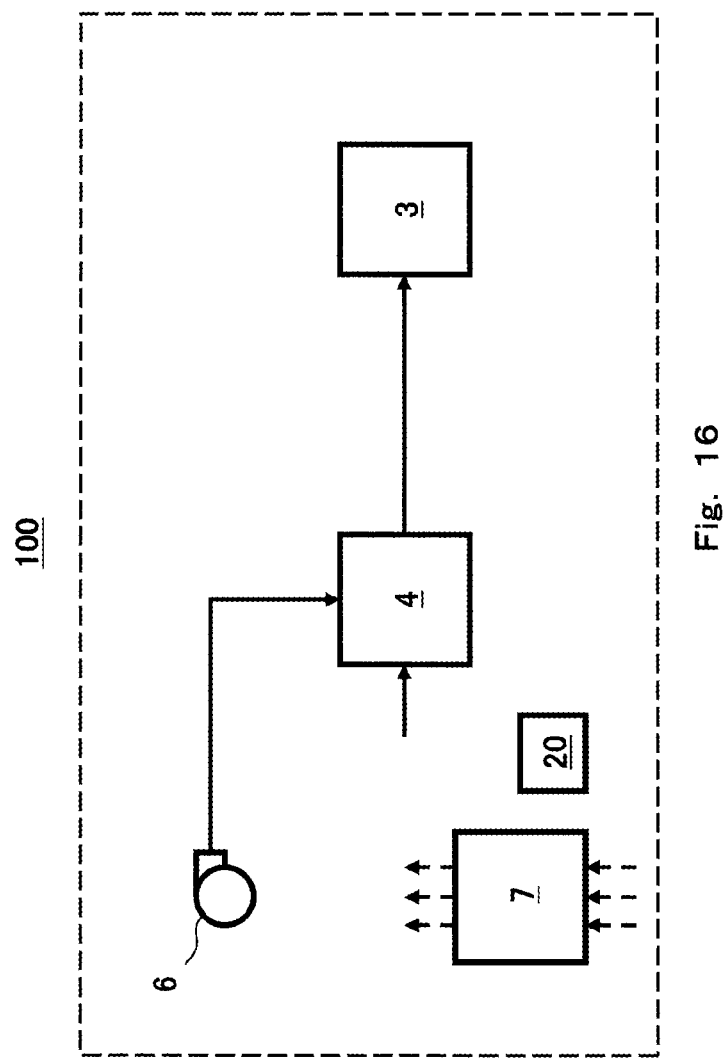
FIG. 16 shows one example of a fuel cell system according to Embodiment 4.

FIG. 16 shows one example of the fuel cell system according to Embodiment 4.

In the example shown in FIG. 16, the fuel cell system 100 according to the present embodiment includes the fuel cell 3, the catalyst 4, the oxidizing gas supply device 6, the controller 7, and a receiver 20.

Since the fuel cell 3, the oxidizing gas supply device 6, and the controller 7 are the same as those described in Embodiment 1, the description of these components is omitted.

The receiver 20 externally receives a command to perform the oxidizing process. The controller 7 performs the oxidizing process of oxidizing the catalyst 4 when the receiver 20 has received the command to perform the oxidizing process.

According to the above, the command to perform the oxidizing process, which is received by the receiver 20, allows the oxidizing process of oxidizing the catalyst 4 to start in a timely manner.

Embodiment 5

A fuel cell system according to Embodiment 5 is configured such that, in the fuel cell system according to any one of Embodiment 1, Examples 1 to 10 of Embodiment 1, Variations 1 and 2 of Embodiment 1, Control Examples 1 to 3 of Embodiment 1, Embodiment 2, Example of Embodiment 2, Embodiment 3, and Embodiment 4, the controller performs the oxidizing process at an end-of-life operation stop of the fuel cell system.

A method of operating a fuel cell system according to Embodiment 5 is such that the method of operating a fuel cell system according to any one of Embodiment 1, Examples 1, 3, 5, and 6 of Embodiment 1, Control Examples 1 to 3 of Embodiment 1, and Embodiments 2 to 4 includes performing the oxidizing process at an end-of-life operation stop of the fuel cell system.

According to the above, the oxidizing process of oxidizing the catalyst can be automatically started at the end-of-life operation stop of the fuel cell system.

Other than the above-described feature, the configuration of the fuel cell system according to Embodiment 5 may be the same as the configuration of the fuel cell system according to any one of Embodiment 1, Examples 1 to 10 of Embodiment 1, Variations 1 and 2 of Embodiment 1, Control Examples 1 to 3 of Embodiment 1, Embodiment 2, Example of Embodiment 2, Embodiment 3, and Embodiment 4.

Other than the above-described feature, the method of operating a fuel cell system according to Embodiment 5 may be the same as the method of operating a fuel cell system according to any one of Embodiment 1, Examples 1, 3, 5, and 6 of Embodiment 1, Control Examples 1 to 3 of Embodiment 1, and Embodiments 2 to 4.

[Apparatus Configuration]

The apparatus configuration of the fuel cell system 100 according to Embodiment 5 is the same as any one of the apparatus configurations described in Embodiment 1, Examples 1 to 10 of Embodiment 1, Variations 1 and 2 of Embodiment 1, Control Examples 1 to 3 of Embodiment 1, Embodiment 2, Example of Embodiment 2, Embodiment 3, and Embodiment 4. Therefore, the description of the apparatus configuration of the fuel cell system 100 according to Embodiment 5 is omitted.

[Operations]

Figure 17:
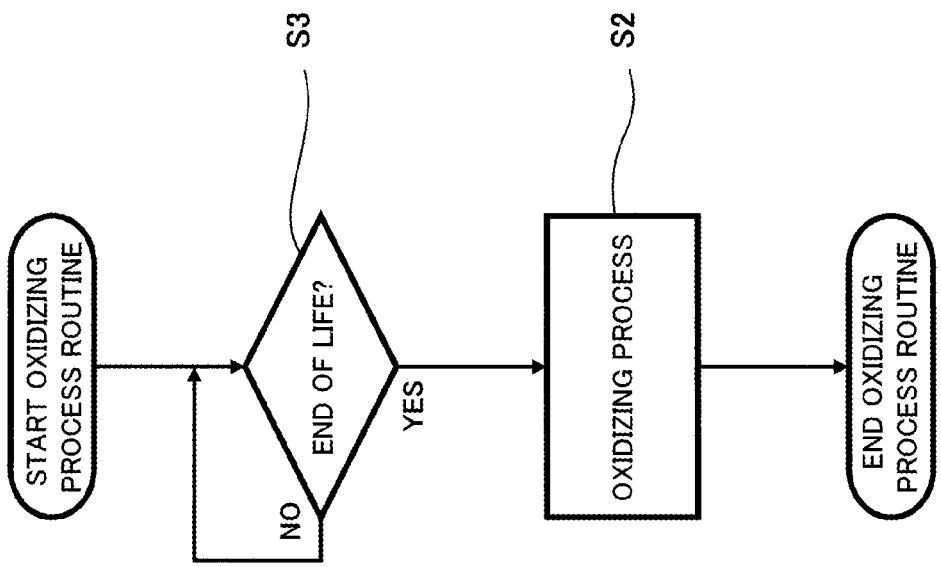
FIG. 17 is a flowchart showing one example of operations of a fuel cell system according to Embodiment 5.

FIG. 17 is a flowchart showing one example of operations of the fuel cell system according to Embodiment 5.

In the present embodiment, as shown in FIG. 17, it is determined whether or not the end of life of the fuel cell system 100 has been reached (step S3). If the end of life of the fuel cell system 100 has been reached, the controller 7 automatically performs the oxidizing process of oxidizing the catalyst 4 (step S2). For example, if a timer stored in the controller 7 indicates that the end of life of the fuel cell system 100 has been reached, the oxidizing process in step S2 automatically starts. It should be noted that the timer can be set based on, for example, an accumulated operating time of the fuel cell system 100 or energized time of the fuel cell system 100.

It should be noted that temperature control in the oxidizing process of oxidizing the catalyst 4 may be performed in the same manner as that described above in any one of Control Examples 1 to 3.

According to the above, in the present embodiment, the oxidizing process of oxidizing the catalyst 4 can be automatically performed at the end-of-life operation stop of the fuel cell system 100. In addition, according to the present embodiment, the controller 7 automatically performs the oxidizing process of oxidizing the catalyst 4 without waiting for disposal work to be performed. This makes it possible to reduce the burden of the disposal work as well as the work time of the disposal work.

Embodiment 6

A fuel cell system according to Embodiment 6 is configured such that the fuel cell system according to any one of Embodiment 1, Examples 1 to 10 of Embodiment 1, Variations 1 and 2 of Embodiment 1, and Control Examples 1 to 3 of Embodiment 1 includes: a hydrodesulfurization catalyst as the catalyst; a reformer configured to generate the hydrogen-containing gas by using the raw material; a recycle passage, through which part of the hydrogen-containing gas that is fed from the reformer is supplied to the hydrodesulfurization catalyst; a branch passage branching off from a fluid passage upstream of the reformer, the branch passage being configured to open to an atmosphere; a first switch provided on the branch passage; and a second switch provided on a fluid passage downstream of the reformer. In the fuel cell system according to Embodiment 6, the oxidizing gas supply device is configured to supply the oxidizing gas to a fluid passage extending from the reformer to the second switch, and the controller, in the oxidizing process, opens the first switch, closes the second switch, and causes the oxidizing gas supply device to operate.

A method of operating a fuel cell system according to Embodiment 6 is such that the method of operating a fuel cell system according to any one of Embodiment 1, Examples 1, 3, 5, and 6 of Embodiment 1, and Control Examples 1 to 3 of Embodiment 1 includes: in the oxidizing process, opening a first switch provided on a branch passage, the branch passage branching off from a fluid passage upstream of a reformer, the branch passage being configured to open to an atmosphere; closing a second switch provided on a fluid passage downstream of the catalyst, which is a hydrodesulfurization catalyst; and supplying, by the oxidizing gas supply device, the oxidizing gas to a fluid passage extending from the reformer to the second switch.

According to the above, the oxidizing process of oxidizing the hydrodesulfurization catalyst can be performed. Therefore, in the disposal process, at the time of removing the hydrodesulfurization catalyst to the outside of the container containing the hydrodesulfurization catalyst, the amount of heat generated due to the oxidation reaction of the hydrodesulfurization catalyst can be reduced compared to conventional art.

Other than the above-described feature, the configuration of the fuel cell system according to Embodiment 6 may be the same as the configuration of the fuel cell system according to any one of Embodiment 1, Examples 1 to 10 of Embodiment 1, Variations 1 and 2 of Embodiment 1, and Control Examples 1 to 3 of Embodiment 1.

Other than the above-described feature, the method of operating a fuel cell system according to Embodiment 6 may be the same as the method of operating a fuel cell system according to any one of Embodiment 1, Examples 1, 3, 5, and 6 of Embodiment 1, and Control Examples 1 to 3 of Embodiment 1.

[Apparatus Configuration]

Figure 18:
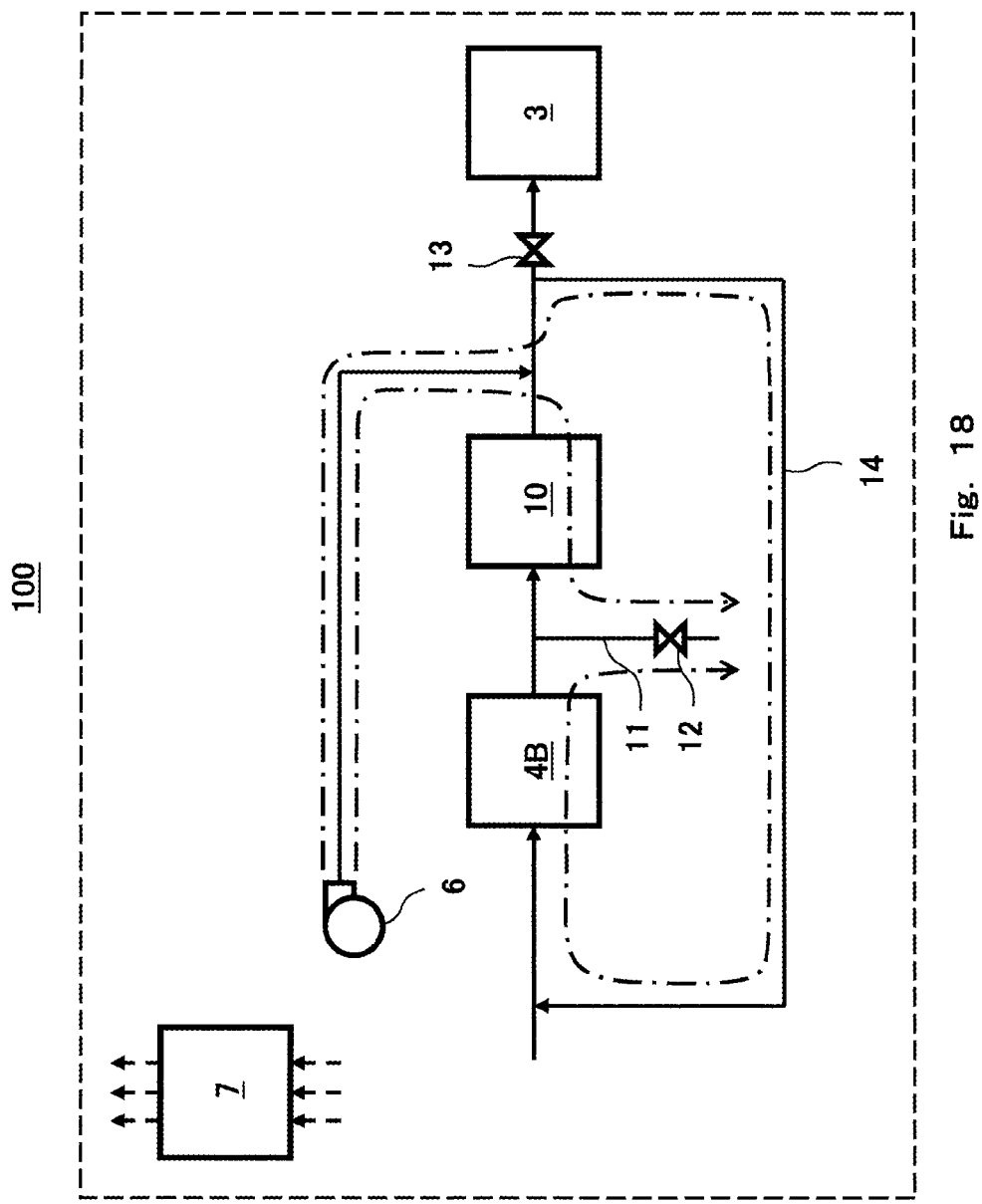
FIG. 18 shows one example of a fuel cell system according to Embodiment 6.

FIG. 18 shows one example of the fuel cell system according to Embodiment 6.

In the example shown in FIG. 18, the fuel cell system 100 according to the present embodiment includes the fuel cell 3, the hydrodesulfurization catalyst 4B, the oxidizing gas supply device 6, the reformer 10, the branch passage 11, the first switch 12, the second switch 13, a recycle passage 14, and the controller 7. That is, in the present embodiment, the catalyst 4 is the hydrodesulfurization catalyst 4B.

The fuel cell 3, the hydrodesulfurization catalyst 4B, the oxidizing gas supply device 6, the reformer 10, the branch passage 11, the first switch 12, the second switch 13, and the controller 7 are the same as those described above. Therefore, the description of these components is omitted.

The recycle passage 14 is a passage through which part of the hydrogen-containing gas that is fed from the reformer 10 is supplied to the hydrodesulfurization catalyst 4B. Accordingly, the hydrogen-containing gas can be added to the hydrodesulfurization catalyst 4B. The upstream end of the recycle passage 14 may be connected to any portion of a passage, so long as the hydrogen-containing gas fed from the reformer 10 flows through the passage. It should be noted that a booster, which is not shown, may be provided on a fluid passage between the branch passage 11 and a merging point when the recycle passage 14 merges with the fluid passage. This makes it possible to increase the pressure of the fluid that is supplied to the reformer 10, and thereby the flow rate of the fluid is adjusted. The booster may be configured in any form, so long as the booster is configured to increase the pressure of the fluid that flows through the fluid passage. The booster is, for example, a fixed displacement pump.

[Operations]

Hereinafter, operations of the fuel cell system 100 according to the present embodiment are described with reference to FIG. 18.

The fuel cell 3 generates electric power by using the hydrogen-containing gas when the fuel cell system 100 is in operation.

At the time, the hydrogen-containing gas that flows through the recycle passage 14 is added to the hydrodesulfurization catalyst 4B. As a result, sulfur compounds in the raw material supplied to the reformer 10 are removed by the hydrodesulfurization catalyst 4B. It should be noted that the hydrogen-containing gas is generated through the reforming reaction of the raw material in the reformer 10.

In the oxidizing process, the oxidizing gas supply device 6 supplies the oxidizing gas to a fluid passage extending from the reformer 10 to the second switch 13. Accordingly, before removal of the hydrodesulfurization catalyst 4B to the outside, the controller 7 controls the oxidizing gas supply device 6 to operate, and thereby the oxidizing process of oxidizing the hydrodesulfurization catalyst 4B can be performed. For example, after stopping the fuel cell system 100 from generating electric power, in disposing of, for example, the fuel cell system 100 or hydrogen generation apparatus, the controller 7 may control, during a period until the hydrodesulfurization catalyst 4B is removed to the outside of the container containing the hydrodesulfurization catalyst 4B, the oxidizing gas supply device 6 to operate, thereby performing the oxidizing process of oxidizing the hydrodesulfurization catalyst 4B in a state where the hydrogen-containing gas is not flowing over the hydrodesulfurization catalyst 4B, which reacts with the oxidizing gas by oxidation.

In the present embodiment, in the oxidizing process, the controller 7 opens the first switch 12, closes the second switch 13, and causes the oxidizing gas supply device 6 to operate. It should be noted that, in the oxidizing process, the controller 7 may cause the aforementioned booster, which is not shown, to operate.

As a result, part of the oxidizing gas is drawn into the recycle passage 14. As indicated by a dashed-dotted line in FIG. 18, the oxidizing gas is supplied to the fluid passage extending from the reformer 10 to the second switch 13, subsequently flows through the recycle passage 14, the hydrodesulfurization catalyst 4B, and the branch passage 11 in this order, and is then discharged to the outside. In this manner, the oxidizing gas is supplied to the hydrodesulfurization catalyst 4B, and the hydrodesulfurization catalyst 4B is oxidized in the oxidizing process. That is, the feature of the present embodiment is that the oxidizing gas supply device 6, the recycle passage 14, the branch passage 11, and the first switch 12 are utilized to supply the oxidizing gas to the hydrodesulfurization catalyst 4B.

As indicated by another dashed-dotted line in FIG. 18, the oxidizing gas is supplied to the fluid passage extending from the reformer 10 to the second switch 13, subsequently flows through the reformer 10 and the branch passage 11 in this order, and is then discharged to the outside. Accordingly, if the reforming catalyst in the reformer 10 is a catalyst that reacts with the oxidizing gas by oxidation, then not only the hydrodesulfurization catalyst 4B but also the reforming catalyst is oxidized in the oxidizing process.

At the time, in every predetermined sampling period, the controller 7 may obtain detection data from a temperature detector for use in detection of the temperature of the hydrodesulfurization catalyst. Temperature control in the oxidizing process of oxidizing the hydrodesulfurization catalyst 4B may be performed in the same manner as that described above in any one of Control Examples 1 to 3.

It should be noted that the branch passage 11 is utilized not only for discharging exhaust gas to the atmosphere in the oxidizing process, but also for other purposes. For example, in a case where the pressure in the reformer 10 becomes high, the first switch 12 may be opened to release the pressure in the reformer 10 to the atmosphere, and thereby the inside of the reformer 10 may be depressurized. In a case where the branch passage 11 is in communication with an evaporator, the first switch 12 may be opened to utilize the branch passage 11 to drain water in the evaporator to the outside of the fuel cell system 100.

Thus, in the present embodiment, the oxidizing process of oxidizing at least the hydrodesulfurization catalyst 4B can be performed by guiding the oxidizing gas through the recycle passage 14 to the branch passage 11. Therefore, in the disposal process, at the time of removing the hydrodesulfurization catalyst 4B to the outside of the container containing the hydrodesulfurization catalyst 4B, the amount of heat generated due to the oxidation reaction of the hydrodesulfurization catalyst 4B can be reduced compared to conventional art.

Example

A fuel cell system according to Example of Embodiment 6 is configured such that the fuel cell system according to Embodiment 6 further includes a shift conversion catalyst as the catalyst, and the oxidizing gas supply device supplies the oxidizing gas to a CO remover, which is configured to reduce carbon monoxide in the hydrogen-containing gas through an oxidation reaction.

According to the above configuration, the oxidizing process of oxidizing the shift conversion catalyst can be performed. Therefore, in the disposal process, at the time of removing the shift conversion catalyst to the outside of the container containing the shift conversion catalyst, the amount of heat generated due to the oxidation reaction of the shift conversion catalyst can be reduced compared to conventional art.

Other than the above-described feature, the configuration of the fuel cell system according to Example of Embodiment 6 may be the same as the configuration of the fuel cell system according to Embodiment 6.

[Apparatus Configuration]

Figure 19:
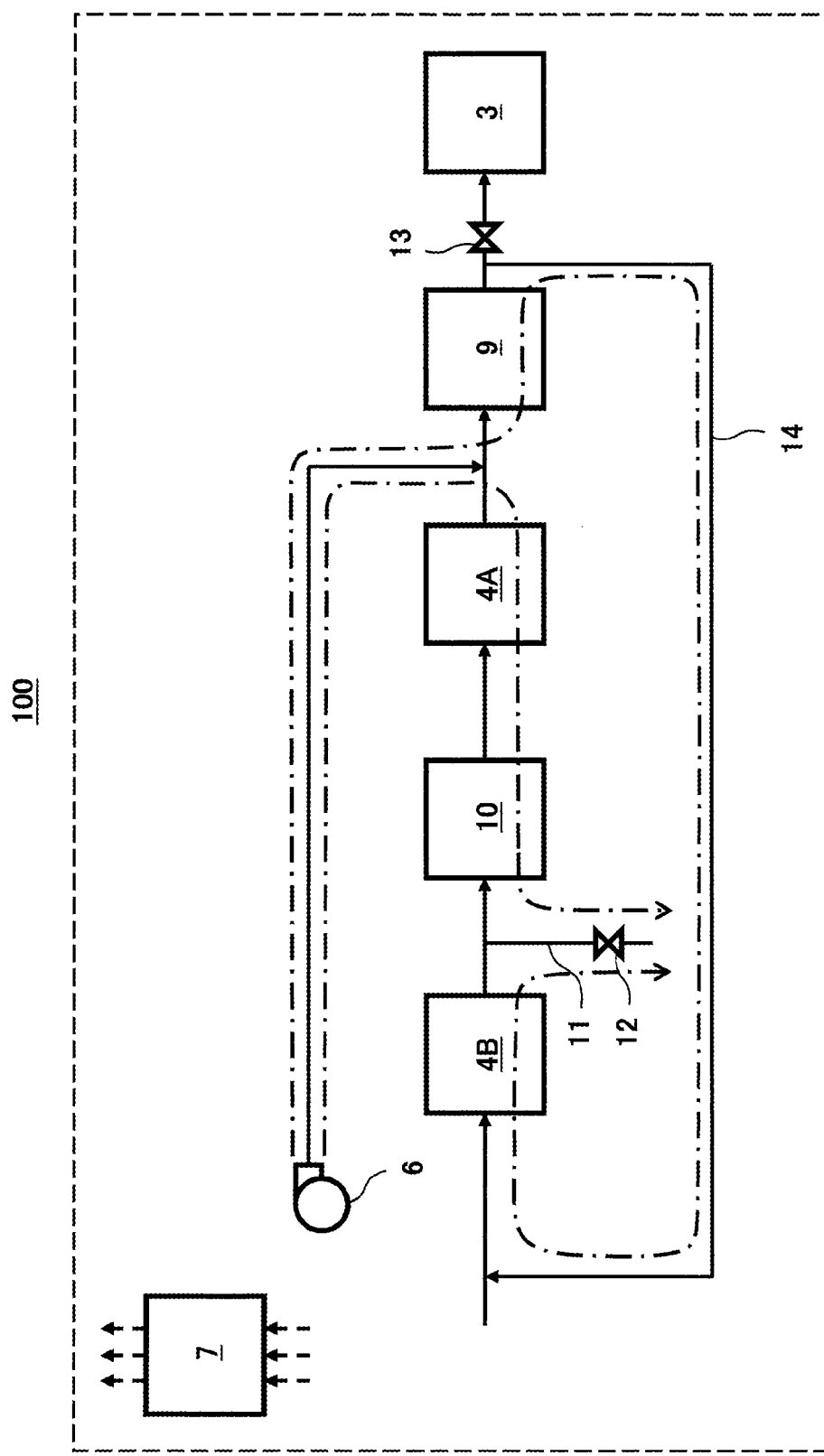
FIG. 19 shows one example of a fuel cell system according to Example of Embodiment 6.

FIG. 19 shows one example of the fuel cell system according to Example of Embodiment 6.

In the example shown in FIG. 19, the fuel cell system 100 according to Example of Embodiment 6 includes the fuel cell 3, the shift conversion catalyst 4A, the hydrodesulfurization catalyst 4B, the oxidizing gas supply device 6, the CO remover 9, the reformer 10, the branch passage 11, the first switch 12, the second switch 13, the recycle passage 14, and the controller 7.

The apparatus configuration of the fuel cell system 100 according to Example of Embodiment 6 is the same as the apparatus configuration described in Embodiment 6, except that the fuel cell system 100 according to Example of Embodiment 6 further includes the shift conversion catalyst 4A as the catalyst 4 and includes the CO remover 9, and that the oxidizing gas supply device 6 supplies the oxidizing gas to the CO remover 9, which is configured to reduce carbon monoxide in the hydrogen-containing gas through an oxidation reaction.

As previously described, the upstream end of the recycle passage 14 may be connected to any portion of a passage, so long as the hydrogen-containing gas fed from the reformer 10 flows through the passage.

For instance, in a case where the fuel cell system 100 includes the shift conversion catalyst 4A and the CO remover 9 as in this example, the upstream end of the recycle passage 14 may be connected to a fluid passage between the CO remover 9 and the fuel cell 3. Alternatively, the upstream end of the recycle passage 14 may be connected to a fluid passage between the shift conversion catalyst 4A and the CO remover 9, or may be connected to a fluid passage between the reformer 10 and the shift conversion catalyst 4A.

[Operations]

Hereinafter, operations of the fuel cell system 100 according to Example of Embodiment 6 are described with reference to FIG. 19.

The fuel cell 3 generates electric power by using the hydrogen-containing gas when the fuel cell system 100 is in operation.

At the time, the oxidizing gas supply device 6 supplies the oxidizing gas to the CO remover 9, which is configured to reduce carbon monoxide in the hydrogen-containing gas through an oxidation reaction. Accordingly, carbon monoxide in the hydrogen-containing gas is reduced by the shift conversion catalyst 4A and the CO remover 9, and then the hydrogen-containing gas is fed to the fuel cell 3.

At the time of stopping the fuel cell system 100 from operating, the second switch 13 is closed to block the communication between the reformer 10 and the atmosphere. That is, the reformer 10 is sealed up. When the reformer 10 is sealed up, there is a case where the pressure in the reformer 10 becomes high due to evaporation of residual water. In this case, the first switch 12 is opened to temporarily release the pressure in the reformer 10 to the atmosphere, and thereby the inside of the reformer 10 is depressurized.

In the oxidizing process, the oxidizing gas supply device 6 supplies the oxidizing gas to a fluid passage extending from the reformer 10 to the second switch 13. Accordingly, before removal of the shift conversion catalyst 4A and the hydrodesulfurization catalyst 4B to the outside, the controller 7 controls the oxidizing gas supply device 6 to operate, and thereby the oxidizing process of oxidizing the shift conversion catalyst 4A and the hydrodesulfurization catalyst 4B can be performed. For example, after stopping the fuel cell system 100 from generating electric power, in disposing of, for example, the fuel cell system 100 or hydrogen generation apparatus, the controller 7 may control, during a period until the shift conversion catalyst 4A and the hydrodesulfurization catalyst 4B are removed to the outside of containers containing the respective catalysts, the oxidizing gas supply device 6 to operate, thereby performing the oxidizing process of oxidizing the shift conversion catalyst 4A and the hydrodesulfurization catalyst 4B in a state where the hydrogen-containing gas is not flowing over the shift conversion catalyst 4A and the hydrodesulfurization catalyst 4B, both of which react with the oxidizing gas by oxidation.

In Example of Embodiment 6, in the oxidizing process, the controller 7 opens the first switch 12, closes the second switch 13, and causes the oxidizing gas supply device 6 to operate. It should be noted that, in the oxidizing process, the controller 7 may cause the aforementioned booster, which is not shown, to operate.

As a result, as indicated by a dashed-dotted line in FIG. 19, the oxidizing gas is supplied to the fluid passage extending from the reformer 10 to the second switch 13, subsequently flows through the shift conversion catalyst 4A, the reformer 10, and the branch passage 11 in this order, and is then discharged to the outside. In this manner, the oxidizing gas is supplied to the shift conversion catalyst 4A, and the shift conversion catalyst 4A is oxidized in the oxidizing process.

It should be noted that if the reforming catalyst in the reformer 10 is a catalyst that reacts with the oxidizing gas by oxidation, then not only the shift conversion catalyst 4A and the hydrodesulfurization catalyst 4B but also the reforming catalyst is oxidized in the oxidizing process.

Further, part of the oxidizing gas is drawn into the recycle passage 14. As indicated by another dashed-dotted line in FIG. 19, the oxidizing gas is supplied to the fluid passage extending from the reformer 10 to the second switch 13, subsequently flows through the recycle passage 14, the hydrodesulfurization catalyst 4B, and the branch passage 11 in this order, and is then discharged to the outside. In this manner, the oxidizing gas is supplied to the hydrodesulfurization catalyst 4B, and the hydrodesulfurization catalyst 4B is oxidized in the oxidizing process. That is, the feature of Example of Embodiment 6 is that the oxidizing gas supply device 6, the recycle passage 14, the branch passage 11, and the first switch 12 are utilized to supply the oxidizing gas to the shift conversion catalyst 4A and the hydrodesulfurization catalyst 4B.

At the time, in every predetermined sampling period, the controller 7 may obtain detection data from a temperature detector for use in detection of the temperature of the shift conversion catalyst. Similarly, in every predetermined sampling period, the controller 7 may obtain detection data from a temperature detector for use in detection of the temperature of the hydrodesulfurization catalyst.

Temperature control in the oxidizing process of oxidizing the shift conversion catalyst 4A and the hydrodesulfurization catalyst 4B may be performed in the same manner as that described above in any one of Control Examples 1 to 3.

Thus, in Example of Embodiment 6, the oxidizing process of oxidizing at least the hydrodesulfurization catalyst 4B and the shift conversion catalyst 4A can be performed by guiding the oxidizing gas through the recycle passage 14 to the branch passage 11. Therefore, in the disposal process, at the time of removing the hydrodesulfurization catalyst 4B to the outside of the container containing the hydrodesulfurization catalyst 4B, the amount of heat generated due to the oxidation reaction of the hydrodesulfurization catalyst 4B can be reduced compared to conventional art. Also, the oxidizing process of oxidizing the shift conversion catalyst 4A can be performed by guiding the oxidizing gas through the reformer 10 to the branch passage 11. Therefore, in the disposal process, at the time of removing the shift conversion catalyst 4A to the outside of the container containing the shift conversion catalyst 4A, the amount of heat generated due to the oxidation reaction of the shift conversion catalyst 4A can be reduced compared to conventional art.

Embodiment 7

A fuel cell system according to Embodiment 7 is configured such that the fuel cell system according to Embodiment 6 includes a third switch provided on the fluid passage upstream of a merging point where the recycle passage merges with the fluid passage, and the controller closes the third switch in the oxidizing process.

According to the above configuration, in the oxidizing process of oxidizing the hydrodesulfurization catalyst, the third switch is closed, which makes it possible to suppress the oxidizing gas from reversely flowing toward a raw material supply source.

Other than the above-described feature, the configuration of the fuel cell system according to Embodiment 7 may be the same as the configuration of the fuel cell system according to Embodiment 6.

[Apparatus Configuration]

Figure 20:
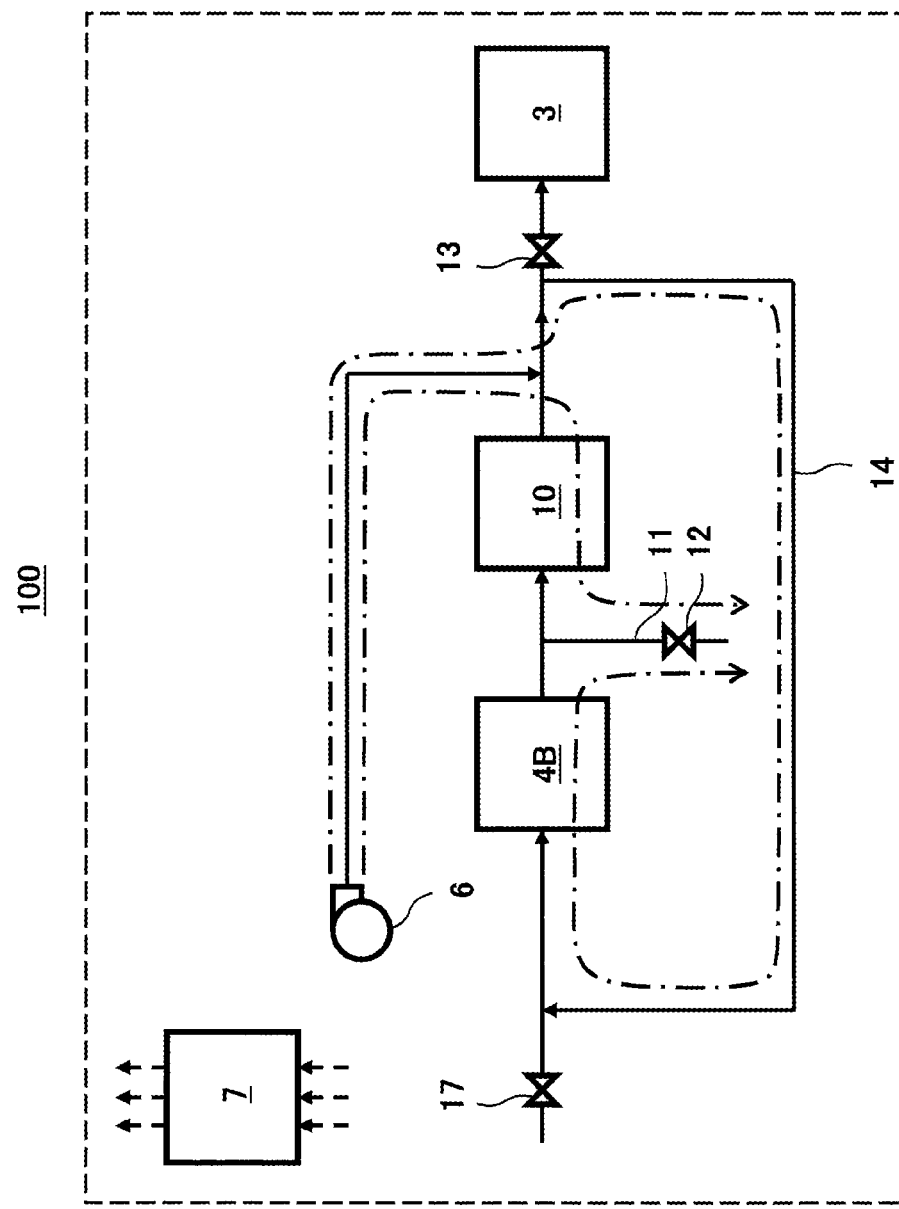
FIG. 20 shows one example of a fuel cell system according to Embodiment 7.

FIG. 20 shows one example of the fuel cell system according to Embodiment 7.

In the example shown in FIG. 20, the fuel cell system 100 according to the present embodiment includes the fuel cell 3, the hydrodesulfurization catalyst 4B, the oxidizing gas supply device 6, the reformer 10, the branch passage 11, the first switch 12, the second switch 13, the recycle passage 14, a third switch 17, and the controller 7.

The fuel cell 3, the hydrodesulfurization catalyst 4B, the oxidizing gas supply device 6, the reformer 10, the branch passage 11, the first switch 12, the second switch 13, the recycle passage 14, and the controller 7 are the same as those described above. Therefore, the description of these components is omitted.

The third switch 17 is provided on a fluid passage upstream of a merging point where the recycle passage 14 merges with the fluid passage. When the third switch 17 is opened, the raw material is supplied to the hydrodesulfurization catalyst 4B from the raw material supply source, which is not shown. When the third switch 17 is closed, the supply of the raw material to the hydrodesulfurization catalyst 4B is blocked. The third switch 17 may be configured in any form, so long as the third switch 17 is configured to open and close the fluid passage upstream of the merging point where the recycle passage 14 merges with the fluid passage. The third switch 17 is, for example, an on-off valve. It should be noted that the raw material supply source has a predetermined supply pressure, and is, for example, a raw material canister or a raw material infrastructure.

[Operations]

Hereinafter, operations of the fuel cell system 100 according to the present embodiment are described with reference to FIG. 20.

The controller 7, before removal of the hydrodesulfurization catalyst 4B to the outside, controls the oxidizing gas supply device 6 to perform the oxidizing process of oxidizing the hydrodesulfurization catalyst 4B. For example, after stopping the fuel cell system 100 from generating electric power, in disposing of, for example, the fuel cell system 100 or hydrogen generation apparatus, the controller 7 may guide the oxidizing gas from the recycle passage 14 to the branch passage 11, thereby supplying the oxidizing gas to the hydrodesulfurization catalyst 4B during a period until the hydrodesulfurization catalyst 4B is removed to the outside of the container containing the hydrodesulfurization catalyst 4B. Then, in the oxidizing process of oxidizing the hydrodesulfurization catalyst 4B, by closing the third switch 17, the oxidizing gas can be suppressed from reversely flowing toward the raw material supply source.

Other than the above-described feature, the operations of the fuel cell system 100 according to Embodiment 7 may be the same as the operations of the fuel cell system 100 according to Embodiment 6.

Example

A fuel cell system according to Example of Embodiment 7 is configured such that the fuel cell system according to Embodiment 7 further includes a shift conversion catalyst as the catalyst, and the oxidizing gas supply device supplies the oxidizing gas to a CO remover, which is configured to reduce carbon monoxide in the hydrogen-containing gas through an oxidation reaction.

According to the above configuration, the oxidizing process of oxidizing the shift conversion catalyst can be performed. Therefore, in the disposal process, at the time of removing the shift conversion catalyst to the outside of the container containing the shift conversion catalyst, the amount of heat generated due to the oxidation reaction of the shift conversion catalyst can be reduced compared to conventional art.

Other than the above-described feature, the configuration of the fuel cell system according to Example of Embodiment 7 may be the same as the configuration of the fuel cell system according to Embodiment 7.

[Apparatus Configuration]

Figure 21:
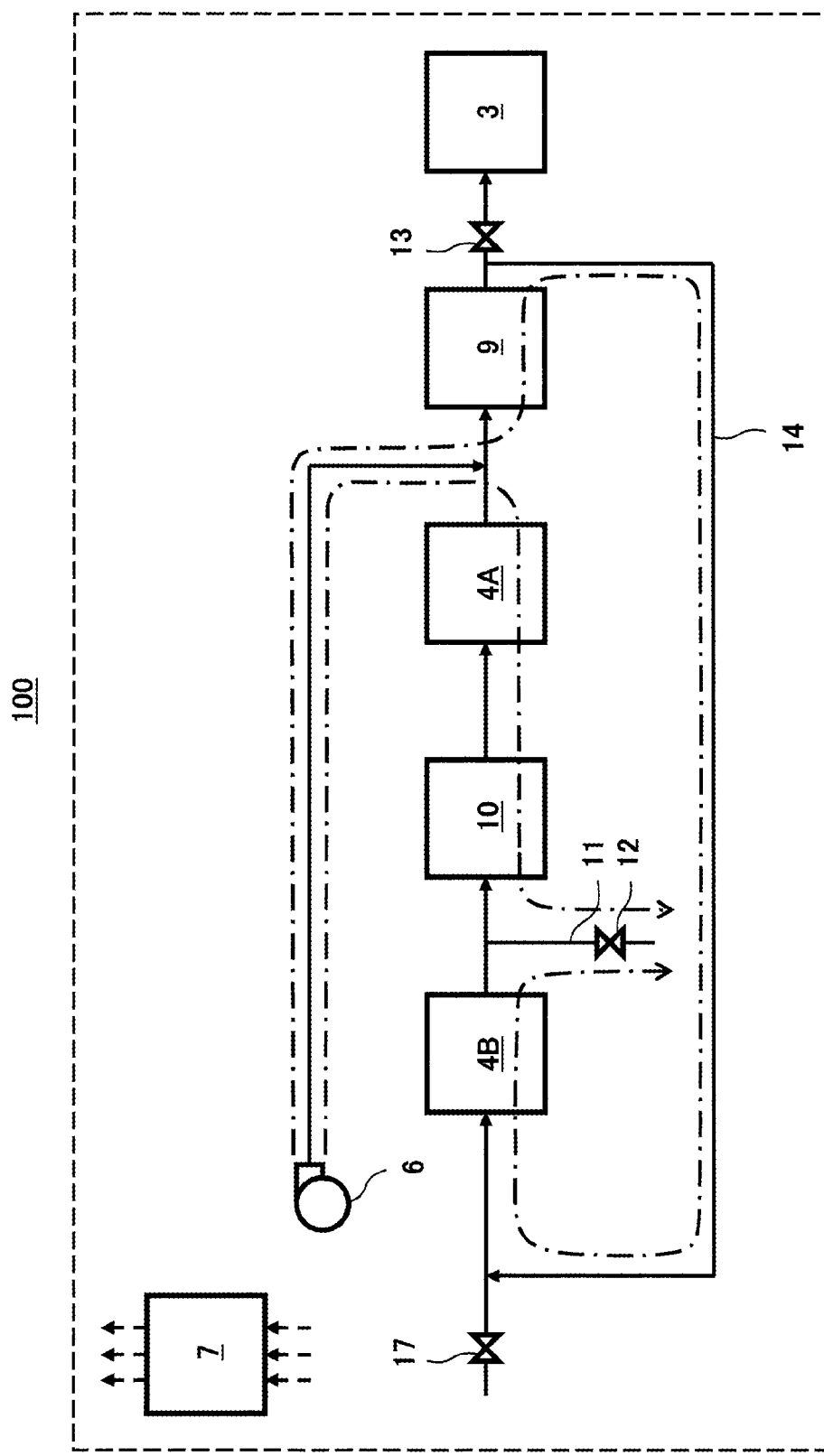
FIG. 21 shows one example of a fuel cell system according to Example of Embodiment 7.

FIG. 21 shows one example of the fuel cell system according to Example of Embodiment 7.

In the example shown in FIG. 21, the fuel cell system 100 according to Example of Embodiment 7 includes the fuel cell 3, the shift conversion catalyst 4A, the hydrodesulfurization catalyst 4B, the oxidizing gas supply device 6, the CO remover 9, the reformer 10, the branch passage 11, the first switch 12, the second switch 13, the recycle passage 14, the third switch 17, and the controller 7.

The apparatus configuration of the fuel cell system 100 according to Example of Embodiment 7 is the same as the apparatus configuration described in Embodiment 7, except that the fuel cell system 100 according to Example of Embodiment 7 further includes the shift conversion catalyst 4A as the catalyst 4 and includes the CO remover 9, and that the oxidizing gas supply device 6 supplies the oxidizing gas to the CO remover 9, which is configured to reduce carbon monoxide in the hydrogen-containing gas through an oxidation reaction.

[Operations]

Hereinafter, operations of the fuel cell system 100 according to Example of Embodiment 7 are described with reference to FIG. 21.

The fuel cell 3 generates electric power by using the hydrogen-containing gas when the fuel cell system 100 is in operation.

At the time, the oxidizing gas supply device 6 supplies the oxidizing gas to the CO remover 9, which is configured to reduce carbon monoxide in the hydrogen-containing gas through an oxidation reaction. Accordingly, carbon monoxide in the hydrogen-containing gas is reduced by the shift conversion catalyst 4A and the CO remover 9, and then the hydrogen-containing gas is fed to the fuel cell 3.

In the oxidizing process, the oxidizing gas supply device 6 supplies the oxidizing gas to a fluid passage extending from the reformer 10 to the second switch 13. Accordingly, before removal of the shift conversion catalyst 4A and the hydrodesulfurization catalyst 4B to the outside, the controller 7 controls the oxidizing gas supply device 6 to operate, and thereby the oxidizing process of oxidizing the shift conversion catalyst 4A and the hydrodesulfurization catalyst 4B can be performed. Then, in the oxidizing process of oxidizing the shift conversion catalyst 4A and the hydrodesulfurization catalyst 4B, by closing the third switch 17, the oxidizing gas can be suppressed from reversely flowing toward the raw material supply source.

Other than the above-described feature, the operations of the fuel cell system 100 according to Example of Embodiment 7 may be the same as the operations of the fuel cell system 100 according to Embodiment 6.

Embodiment 8

A fuel cell system according Embodiment 8 is configured such that the fuel cell system according to any one of Embodiment 1, Examples 1 to 10 of Embodiment 1, Variations 1 and 2 of Embodiment 1, and Control Examples 1 to 3 of Embodiment 1 includes: a hydrodesulfurization catalyst as the catalyst; a reformer configured to generate the hydrogen-containing gas by using the raw material; a recycle passage, through which part of the hydrogen-containing gas that is fed from the reformer is supplied to the hydrodesulfurization catalyst; a booster provided on a fluid passage between the reformer and a merging point where the recycle passage merges with the fluid passage; and a third switch provided on the fluid passage upstream of the merging point where the recycle passage merges with the fluid passage. In the fuel cell system according Embodiment 8, the oxidizing gas supply device is configured to supply the oxidizing gas to a fluid passage between the reformer and an upstream end of the recycle passage, and the controller, in the oxidizing process, closes the third switch and causes the booster and the oxidizing gas supply device to operate.

A method of operating a fuel cell system according to Embodiment 8 is such that the method of operating a fuel cell system according to any one of Embodiment 1, Examples 1, 3, 5, and 6 of Embodiment 1, and Control Examples 1 to 3 of Embodiment 1 includes: in the oxidizing process, closing a third switch, the third switch being provided on a fluid passage upstream of a merging point where a recycle passage merges with the fluid passage, the recycle passage being a passage through which part of the hydrogen-containing gas that is fed from a reformer is supplied to a hydrodesulfurization catalyst; causing a booster to operate, the booster being provided on a fluid passage between the reformer and the merging point where the recycle passage merges with the fluid passage; and supplying, by the oxidizing gas supply device, the oxidizing gas to a fluid passage between the reformer and an upstream end of the recycle passage.

According to the above, the oxidizing process of oxidizing the hydrodesulfurization catalyst can be performed. Therefore, in the disposal process, at the time of removing the hydrodesulfurization catalyst to the outside of the container containing the hydrodesulfurization catalyst, the amount of heat generated due to the oxidation reaction of the hydrodesulfurization catalyst can be reduced compared to conventional art. In addition, unlike the fuel cell system according to Embodiment 7, the use of the branch passage and the first switch is unnecessary in the oxidizing process. This makes it possible to simplify the configuration of the fuel cell system.

Other than the above-described feature, the configuration of the fuel cell system according to Embodiment 8 may be the same as the configuration of the fuel cell system according to any one of Embodiment 1, Examples 1 to 10 of Embodiment 1, Variations 1 and 2 of Embodiment 1, and Control Examples 1 to 3 of Embodiment 1.

Other than the above-described feature, the method of operating a fuel cell system according to Embodiment 8 may be the same as the method of operating a fuel cell system according to any one of Embodiment 1, Examples 1, 3, 5, and 6 of Embodiment 1, and Control Examples 1 to 3 of Embodiment 1.

[Apparatus Configuration]

Figure 22:
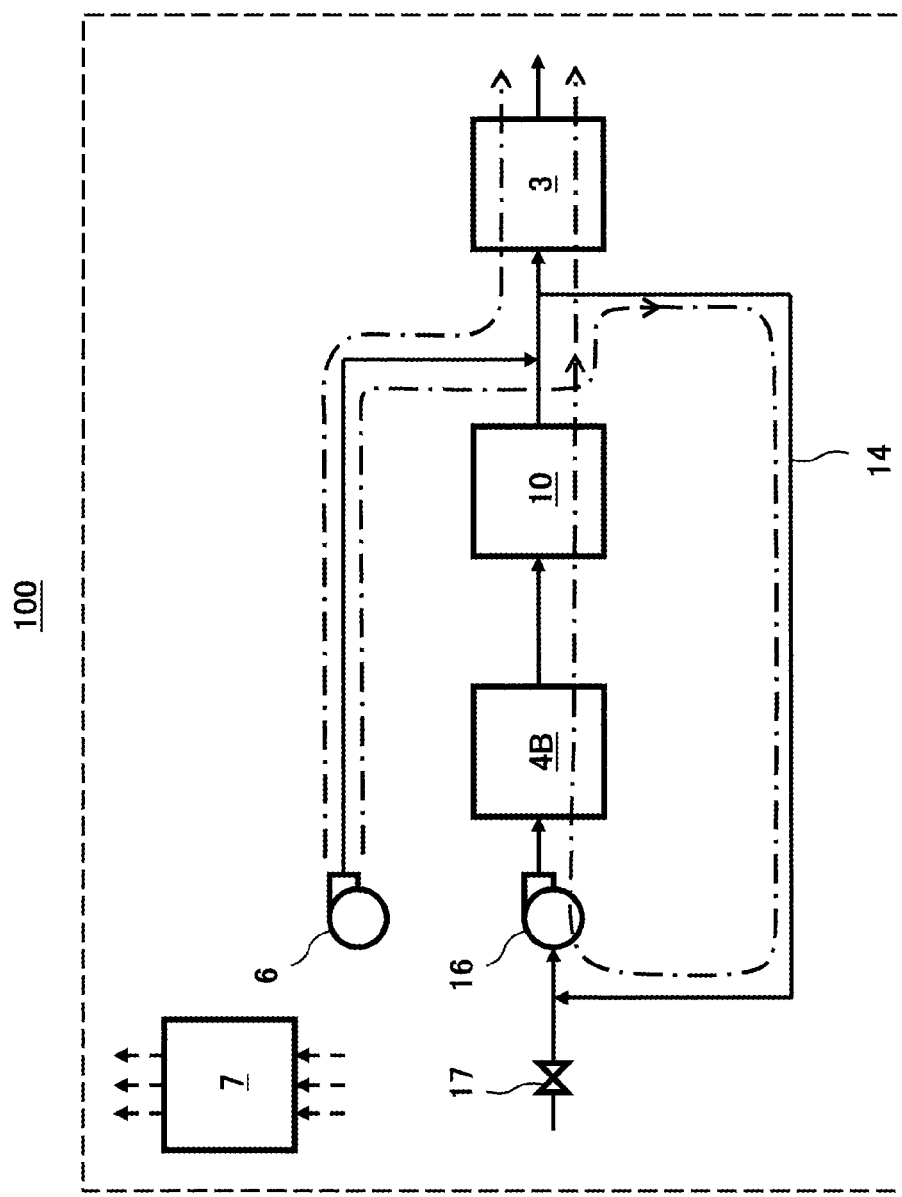
FIG. 22 shows one example of a fuel cell system according to Embodiment 8.

FIG. 22 shows one example of the fuel cell system according to Embodiment 8.

In the example shown in FIG. 22, the fuel cell system 100 according to the present embodiment includes the fuel cell 3, the hydrodesulfurization catalyst 4B, the oxidizing gas supply device 6, the reformer 10, the recycle passage 14, a booster 16, the third switch 17, and the controller 7. The apparatus configuration of the fuel cell system 100 according to Embodiment 8 is the same as the apparatus configuration described in Embodiment 7, except that the fuel cell system 100 according to Embodiment 8 includes the booster 16 and does not include the branch passage 11, the first switch 12, and the second switch 13.

The booster 16 is provided on a fluid passage between the reformer 10 and a merging point where the recycle passage 14 merges with the fluid passage. This makes it possible to increase the pressure of the fluid that is supplied to the reformer 10, and thereby the flow rate of the fluid is adjusted. The booster 16 may be configured in any form, so long as the booster 16 is configured to increase the pressure of the fluid that flows through the fluid passage. The booster 16 is, for example, a fixed displacement pump.

[Operations]

Hereinafter, operations of the fuel cell system 100 according to the present embodiment are described with reference to FIG. 22.

The fuel cell 3 generates electric power by using the hydrogen-containing gas when the fuel cell system 100 is in operation.

At the time, the hydrogen-containing gas that flows through the recycle passage 14 is added to the hydrodesulfurization catalyst 4B. As a result, sulfur compounds in the raw material supplied to the reformer 10 are removed by the hydrodesulfurization catalyst 4B. It should be noted that the hydrogen-containing gas is generated through the reforming reaction of the raw material in the reformer 10.

In the oxidizing process, the oxidizing gas supply device 6 supplies the oxidizing gas to a fluid passage between the reformer 10 and the upstream end of the recycle passage 14, and the booster 16 supplies the oxidizing gas through a fluid passage that includes the recycle passage 14 and that leads to the upstream end of the recycle passage 14. Accordingly, before removal of the hydrodesulfurization catalyst 4B to the outside, the controller 7 controls the oxidizing gas supply device 6 and the booster 16 to operate, and thereby the oxidizing process of oxidizing the hydrodesulfurization catalyst 4B can be performed. For example, after stopping the fuel cell system 100 from generating electric power, in disposing of, for example, the fuel cell system 100 or hydrogen generation apparatus, the controller 7 may control, during a period until the hydrodesulfurization catalyst 4B is removed to the outside of the container containing the hydrodesulfurization catalyst 4B, the oxidizing gas supply device 6 and the booster 16 to operate to perform the oxidizing process of oxidizing the hydrodesulfurization catalyst 4B in a state where the hydrogen-containing gas is not flowing over the hydrodesulfurization catalyst 4B, which reacts with the oxidizing gas by oxidation.

In the present embodiment, in the oxidizing process, the controller 7 closes the third switch 17 and causes the oxidizing gas supply device 6 and the booster 16 to operate.

As a result, the operation of the booster 16 causes part of the oxidizing gas to be drawn into the recycle passage 14. As indicated by a dashed-dotted line in FIG. 22, the oxidizing gas flows through the recycle passage 14, the booster 16, the hydrodesulfurization catalyst 4B, the reformer 10, and the fuel cell 3 in this order, such that the oxidizing gas is supplied through the fluid passage that includes the recycle passage 14 and that leads to the upstream end of the recycle passage 14, and then the oxidizing gas is discharged to the outside. In this manner, the oxidizing gas is supplied to the hydrodesulfurization catalyst 4B, and the hydrodesulfurization catalyst 4B is oxidized in the oxidizing process. That is, the feature of the present embodiment is that the recycle passage 14 and the booster 16 are utilized to supply the oxidizing gas to the hydrodesulfurization catalyst 4B. It should be noted that if the reforming catalyst in the reformer 10 is a catalyst that reacts with the oxidizing gas by oxidation, then not only the hydrodesulfurization catalyst 4B but also the reforming catalyst is oxidized in the oxidizing process.

At the time, in every predetermined sampling period, the controller 7 may obtain detection data from a temperature detector for use in detection of the temperature of the hydrodesulfurization catalyst It should be noted that temperature control in the oxidizing process of oxidizing the hydrodesulfurization catalyst 4B may be performed in the same manner as that described above in any one of Control Examples 1 to 3.

The branch passage 11 is utilized not only for discharging exhaust gas to the atmosphere in the oxidizing process, but also for other purposes. For example, in a case where the pressure in the reformer 10 becomes high, the first switch 12 may be opened to release the pressure in the reformer 10 to the atmosphere, and thereby the inside of the reformer 10 may be depressurized. In a case where the branch passage 11 is in communication with an evaporator, the first switch 12 may be opened to utilize the branch passage 11 to drain water in the evaporator to the outside of the fuel cell system 100.

Thus, in the present embodiment, the oxidizing process of oxidizing at least the hydrodesulfurization catalyst 4B can be performed by guiding the oxidizing gas through the recycle passage 14, the hydrodesulfurization catalyst 4B, and the reformer 10 in this order. Therefore, in the disposal process, at the time of removing the hydrodesulfurization catalyst 4B to the outside of the container containing the hydrodesulfurization catalyst 4B, the amount of heat generated due to the oxidation reaction of the hydrodesulfurization catalyst 4B can be reduced compared to conventional art. In addition, unlike the fuel cell system 100 according to Embodiment 7, the use of the branch passage 11 and the first switch 12 is unnecessary in the oxidizing process. This makes it possible to simplify the configuration of the fuel cell system 100.

Example

A fuel cell system according to Example of Embodiment 8 is configured such that the fuel cell system according to Embodiment 8 further includes a shift conversion catalyst as the catalyst, and the oxidizing gas supply device supplies the oxidizing gas to a CO remover, which is configured to reduce carbon monoxide in the hydrogen-containing gas through an oxidation reaction.

According to the above configuration, the oxidizing process of oxidizing the shift conversion catalyst can be performed. Therefore, in the disposal process, at the time of removing the shift conversion catalyst to the outside of the container containing the shift conversion catalyst, the amount of heat generated due to the oxidation reaction of the shift conversion catalyst can be reduced compared to conventional art. In addition, unlike the fuel cell system according to Embodiment 7, the use of the branch passage and the first switch is unnecessary in the oxidizing process. This makes it possible to simplify the configuration of the fuel cell system.

Other than the above-described feature, the configuration of the fuel cell system according to Example of Embodiment 8 may be the same as the configuration of the fuel cell system according to Embodiment 8.

[Apparatus Configuration]

Figure 23:
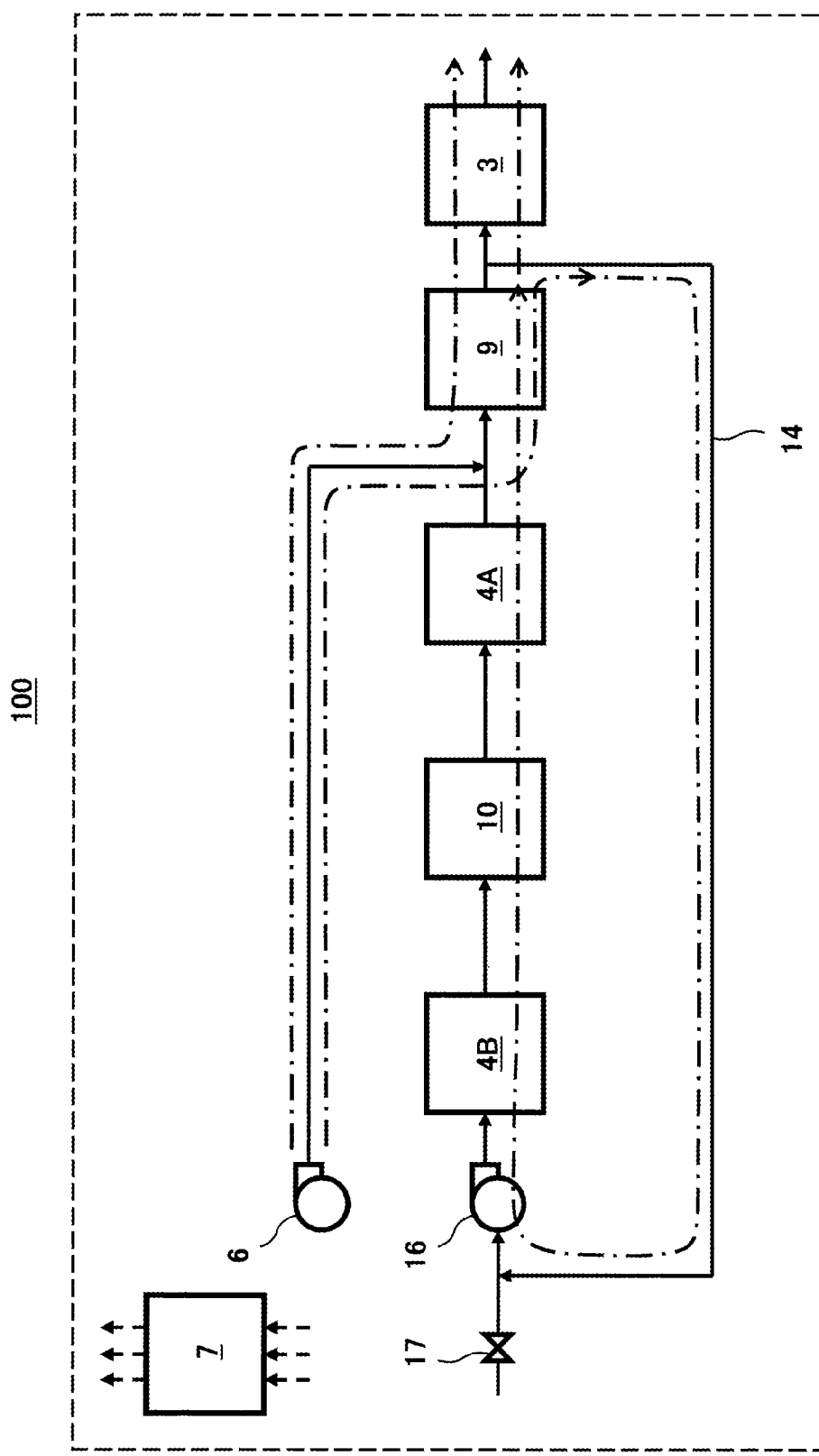
FIG. 23 shows one example of a fuel cell system according to Example of Embodiment 8.

FIG. 23 shows one example of the fuel cell system according to Example of Embodiment 8.

In the example shown in FIG. 23, the fuel cell system 100 according to Example of Embodiment 8 includes the fuel cell 3, the shift conversion catalyst 4A, the hydrodesulfurization catalyst 4B, the oxidizing gas supply device 6, the CO remover 9, the reformer 10, the recycle passage 14, the booster 16, the third switch 17, and the controller 7. The apparatus configuration of the fuel cell system 100 according to Example of Embodiment 8 is the same as the apparatus configuration described in Embodiment 8, except that the fuel cell system 100 according to Example of Embodiment 8 further includes the shift conversion catalyst 4A as the catalyst 4 and includes the CO remover 9, and that the oxidizing gas supply device 6 supplies the oxidizing gas to the CO remover 9, which is configured to reduce carbon monoxide in the hydrogen-containing gas through an oxidation reaction.

[Operations]

Hereinafter, operations of the fuel cell system 100 according to Example of Embodiment 8 are described with reference to FIG. 23.

The fuel cell 3 generates electric power by using the hydrogen-containing gas when the fuel cell system 100 is in operation.

At the time, the oxidizing gas supply device 6 supplies the oxidizing gas to the CO remover 9, which is configured to reduce carbon monoxide in the hydrogen-containing gas through an oxidation reaction. Accordingly, carbon monoxide in the hydrogen-containing gas is reduced by the shift conversion catalyst 4A and the CO remover 9, and then the hydrogen-containing gas is fed to the fuel cell 3.

In the oxidizing process, the oxidizing gas supply device 6 supplies the oxidizing gas to a fluid passage between the reformer 10 and the upstream end of the recycle passage 14, and the booster 16 supplies the oxidizing gas through a fluid passage that includes the recycle passage 14 and that leads to the upstream end of the recycle passage 14. Accordingly, before removal of the shift conversion catalyst 4A and the hydrodesulfurization catalyst 4B to the outside, the controller 7 controls the oxidizing gas supply device 6 and the booster 16 to operate, and thereby the oxidizing process of oxidizing the shift conversion catalyst 4A and the hydrodesulfurization catalyst 4B can be performed. For example, after stopping the fuel cell system 100 from generating electric power, in disposing of, for example, the fuel cell system 100 or hydrogen generation apparatus, the controller 7 may control, during a period until the shift conversion catalyst 4A and the hydrodesulfurization catalyst 4B are removed to the outside of containers containing the respective catalysts, the oxidizing gas supply device 6 and the booster 16 to operate to perform the oxidizing process of oxidizing the shift conversion catalyst 4A and the hydrodesulfurization catalyst 4B in a state where the hydrogen-containing gas is not flowing over the shift conversion catalyst 4A and the hydrodesulfurization catalyst 4B, both of which react with the oxidizing gas by oxidation.

In Example of Embodiment 8, in the oxidizing process, the controller 7 closes the third switch 17 and causes the oxidizing gas supply device 6 and the booster 16 to operate.

As a result, the operation of the booster 16 causes part of the oxidizing gas to be drawn into the recycle passage 14. As indicated by a dashed-dotted line in FIG. 23, the oxidizing gas flows through the recycle passage 14, the booster 16, the hydrodesulfurization catalyst 4B, the reformer 10, the shift conversion catalyst 4A, the CO remover 9, and the fuel cell 3 in this order, such that the oxidizing gas is supplied to the fluid passage that includes the recycle passage 14 and that leads to the upstream end of the recycle passage 14, and then the oxidizing gas is discharged to the outside. In this manner, the oxidizing gas is supplied to the shift conversion catalyst 4A and the hydrodesulfurization catalyst 4B, and these catalysts are oxidized in the oxidizing process. That is, the feature of Example of Embodiment 8 is that the recycle passage 14 and the booster 16 are utilized to supply the oxidizing gas to the shift conversion catalyst 4A and the hydrodesulfurization catalyst 4B.

It should be noted that if the reforming catalyst in the reformer 10 is a catalyst that reacts with the oxidizing gas by oxidation, then not only the shift conversion catalyst 4A and the hydrodesulfurization catalyst 4B but also the reforming catalyst is oxidized in the oxidizing process.

At the time, in every predetermined sampling period, the controller 7 may obtain detection data from a temperature detector for use in detection of the temperature of the shift conversion catalyst. Similarly, in every predetermined sampling period, the controller 7 may obtain detection data from a temperature detector for use in detection of the temperature of the hydrodesulfurization catalyst.

It should be noted that temperature control in the oxidizing process of oxidizing the shift conversion catalyst 4A and the hydrodesulfurization catalyst 4B is performed in the same manner as that described above in any one of Control Examples 1 to 3. Therefore, the description of the temperature control is omitted.

Thus, in Example of Embodiment 8, the oxidizing process of oxidizing at least the hydrodesulfurization catalyst 4B and the shift conversion catalyst 4A can be performed by guiding the oxidizing gas through the recycle passage 14, the hydrodesulfurization catalyst 4B, and the reformer 10 in this order. Therefore, in the disposal process, at the time of removing the hydrodesulfurization catalyst 4B to the outside of the container containing the hydrodesulfurization catalyst 4B, the amount of heat generated due to the oxidation reaction of the hydrodesulfurization catalyst 4B can be reduced compared to conventional art. Moreover, the shift conversion catalyst 4A can also be oxidized in the oxidizing process. Therefore, in the disposal process, at the time of removing the shift conversion catalyst 4A to the outside of the container containing the shift conversion catalyst 4A, the amount of heat generated due to the oxidation reaction of the shift conversion catalyst 4A can be reduced compared to conventional art. Furthermore, unlike the fuel cell system 100 according to Embodiment 7, the use of the branch passage 11 and the first switch 12 is unnecessary in the oxidizing process. This makes it possible to simplify the configuration of the fuel cell system 100.

Embodiment 9

A fuel cell system according to Embodiment 9 is configured such that the fuel cell system according to any one of Embodiment 1, Examples 1 to 10 of Embodiment 1, and Control Examples 1 to 3 of Embodiment 1 includes a raw material supply device provided on a raw material supply passage upstream of the catalyst, and the raw material supply device acts as the oxidizing gas supply device to supply the oxidizing gas to the catalyst in the oxidizing process.

According to the above configuration, the oxidizing process of oxidizing the catalyst can be performed by using the raw material supply device as the oxidizing gas supply device. This eliminates the necessity of additionally including another oxidizing gas supply device for use in the oxidizing process, and thus the system configuration is simplified.

Other than the above-described feature, the configuration of the fuel cell system according to Embodiment 9 may be the same as the configuration of the fuel cell system according to any one of Embodiment 1, Examples 1 to 10 of Embodiment 1, and Control Examples 1 to 3 of Embodiment 1.

[Apparatus Configuration]

Figure 24:
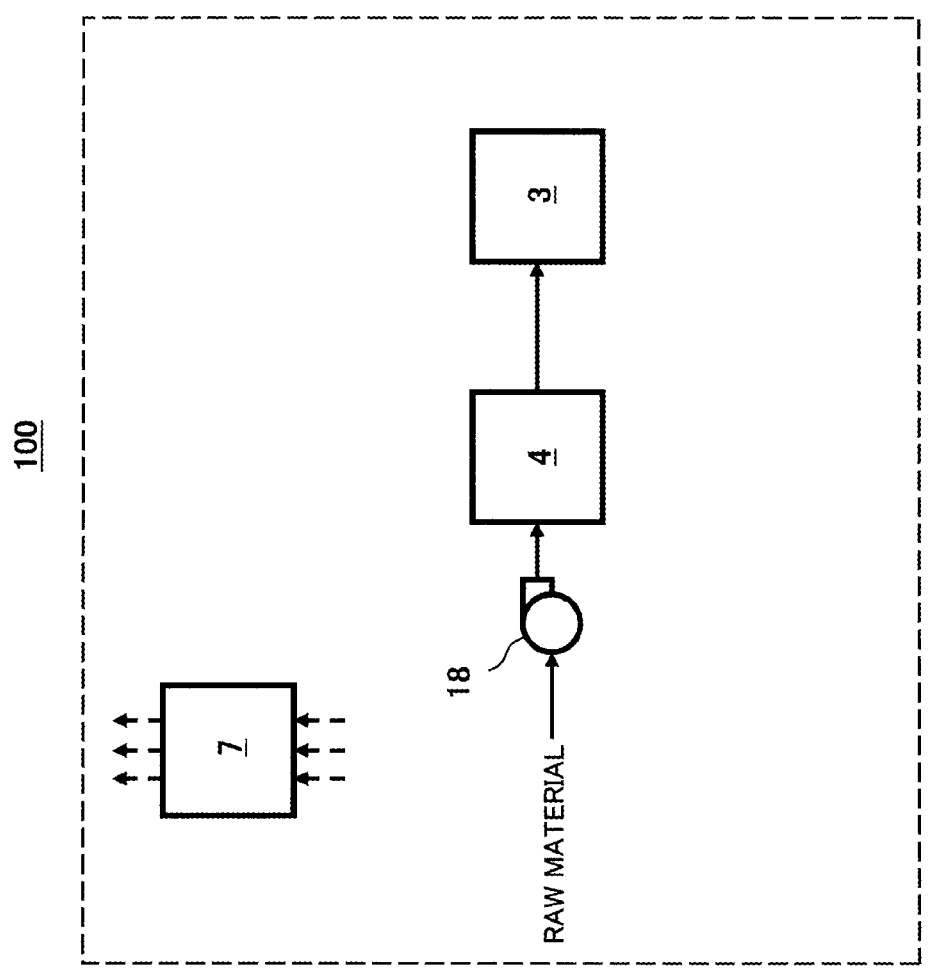
FIG. 24 shows one example of a fuel cell system according to Embodiment 9.

FIG. 24 shows one example of the fuel cell system according to Embodiment 9.

In the example shown in FIG. 24, the fuel cell system 100 according to the present embodiment includes the fuel cell 3, the catalyst 4, a raw material supply device 18, and the controller 7.

Since the fuel cell 3, the catalyst 4, and the controller 7 are the same as those described above, the description of these components is omitted.

The raw material supply device 18 is provided on a raw material supply passage upstream of the catalyst 4. The raw material supply device 18 is a device configured to adjust the flow rate of a raw material. For example, the raw material supply device 18 is constituted by a booster and a flow rate adjusting valve. Alternatively, the raw material supply device 18 may be constituted by either one of these. In the present embodiment, as one example, a fixed displacement pump is used as the booster. However, the booster is not limited to a fixed displacement pump. The raw material is supplied from a raw material supply source to the raw material supply device 18. The raw material supply source has a predetermined supply pressure, and is, for example, a raw material canister or a raw material infrastructure. It should be noted that, as previously described, the raw material is, for example, an organic compound comprised of at least carbon and hydrogen, such as city gas or natural gas both containing methane as a main component, or LPG In the present embodiment, in the oxidizing process of oxidizing the catalyst 4, the raw material supply device 18 acts as the oxidizing gas supply device to supply the oxidizing gas to the catalyst 4. Specifically, when the raw material supply source, which is positioned upstream of the raw material supply device 18, is removed, the upstream of the raw material supply device 18 becomes open to the atmosphere. Accordingly, the raw material supply device 18 is used as the oxidizing gas supply device, and thereby air as one example of the oxidizing gas is supplied to the catalyst 4.

[Operations]

Hereinafter, operations of the fuel cell system 100 according to the present embodiment are described with reference to FIG. 20.

The fuel cell 3 generates electric power by using the hydrogen-containing gas when the fuel cell system 100 is in operation. It should be noted that, at the time, the hydrogen-containing gas is generated through a reforming reaction of the raw material in a reformer, which is not shown.

When the raw material supply source, which is positioned upstream of the raw material supply device 18, is removed, the upstream of the raw material supply device 18 becomes open to the atmosphere. Thereafter, before removal of the catalyst 4 to the outside, the controller 7 controls the raw material supply device 18 acting as the oxidizing gas supply device to perform the oxidizing process of oxidizing the catalyst 4. For example, after stopping the fuel cell system 100 from generating electric power, in disposing of, for example, the fuel cell system 100 or hydrogen generation apparatus, the controller 7 may control, during a period until the catalyst 4 is removed to the outside of the container, the raw material supply device 18 acting as the oxidizing gas supply device to perform the oxidizing process of oxidizing the catalyst 4 in a state where the hydrogen-containing gas is not flowing over the catalyst 4, which reacts with the oxidizing gas by oxidation.

According to the above, the oxidizing process of oxidizing the catalyst 4 can be performed by using the raw material supply device 18 as the oxidizing gas supply device. This eliminates the necessity of additionally including another oxidizing gas supply device for use in the oxidizing process, and thus the system configuration is simplified.

From the foregoing description, numerous modifications and other embodiments of the present invention are obvious to one skilled in the art. Therefore, the foregoing description should be interpreted only as an example and is provided for the purpose of teaching the best mode for carrying out the present invention to one skilled in the art. The structural and/or functional details may be substantially altered without departing from the spirit of the present invention.

INDUSTRIAL APPLICABILITY

According to one aspect of the present invention, in the disposal process, at the time of removing the catalyst to the outside of the container containing the catalyst, the amount of heat generated due to the oxidation reaction of the catalyst can be reduced compared to conventional art. Therefore, the one aspect of the present invention is applicable to, for example, a fuel cell system or a method of operating a fuel cell system.

REFERENCE SIGNS LIST 3 fuel cell
4 catalyst
4A shift conversion catalyst
4B hydrodesulfurization catalyst
4C catalyst containing a base metal
4D methanation catalyst
4E reforming catalyst
5 reactor
6 oxidizing gas supply device
7 controller
9 CO remover
10 reformer
11 branch passage
12 first switch
13 second switch
14 recycle passage
16 booster
17 third switch
18 raw material supply device
20 receiver
100 fuel cell system

The invention claimed is:

1. A method of operating a fuel cell system, comprising:
generating electric power by a fuel cell by using a hydrogen-containing gas when the fuel cell system is in operation; and
controlling, before removal of a catalyst to outside, an oxidizing gas supply device to perform an oxidizing process of oxidizing the catalyst, which reacts with an oxidizing gas by oxidation,
wherein the catalyst is located in a gas passage through which a hydrogen containing gas or a raw material from which the hydrogen containing gas is generated flows to the fuel cell.

2. The method of operating a fuel cell system according to claim 1, comprising controlling, before removal of the catalyst to the outside, the oxidizing gas supply device to supply the oxidizing gas to the catalyst to perform the oxidizing process of oxidizing the catalyst, the oxidizing gas being in an amount greater than an amount of oxidizing gas supplied to the catalyst at a normal power generation stop.

3. The method of operating a fuel cell system according to claim 1, wherein
in the oxidizing process, the oxidizing gas supply device supplies, to a reactor including the catalyst, the oxidizing gas in an amount at least greater than or equal to a volume of the reactor.

4. The method of operating a fuel cell system according to claim 1, wherein:
the catalyst is located on the gas passage through which the raw material flows, and
the oxidizing process includes a period in which no raw material flows over the catalyst.

5. The method of operating a fuel cell system according to claim 1, wherein
the oxidizing process includes a period in which no gas other than the oxidizing gas flows over the catalyst.

6. The method of operating a fuel cell system according to claim 1, comprising stopping the oxidizing gas supply device when a temperature of the catalyst has become higher than or equal to a first threshold.

7. The method of operating a fuel cell system according to claim 6, comprising causing the oxidizing gas supply device to resume operating when the temperature of the catalyst has become lower than or equal to a second threshold, which is lower than the first threshold.

8. The method of operating a fuel cell system according to claim 1, comprising stopping the oxidizing gas supply device if an upward trend of a temperature of the catalyst ends when the oxidizing gas supply device is in operation.

9. The method of operating a fuel cell system according to claim 1, comprising:
in the oxidizing process,
opening a first switch provided on a branch passage, the branch passage branching off from a fluid passage upstream of the catalyst, the branch passage being configured to open to an atmosphere;
closing a second switch provided on a fluid passage downstream of the catalyst; and
supplying, by the oxidizing gas supply device, the oxidizing gas to a fluid passage extending from the catalyst to the second switch.

10. The method of operating a fuel cell system according to claim 1, comprising performing the oxidizing process when an operator has performed a manual input to an operating unit.

11. The fuel cell system according to claim 1, comprising performing the oxidizing process when having externally received a command to perform the oxidizing process.

12. The method of operating a fuel cell system according to claim 1, comprising performing the oxidizing process at an end-of-life operation stop of the fuel cell system.

13. The method of operating a fuel cell system according to claim 1, comprising:
in the oxidizing process,
opening a first switch provided on a branch passage, the branch passage branching off from a fluid passage upstream of a reformer, the branch passage being configured to open to an atmosphere;
closing a second switch provided on a fluid passage downstream of the catalyst, which is the hydrodesulfurization catalyst; and
supplying, by the oxidizing gas supply device, the oxidizing gas to a fluid passage extending from the reformer to the second switch.

14. The method of operating a fuel cell system according to claim 1, comprising:
in the oxidizing process,
closing a switch, the switch being provided on a fluid passage upstream of a merging point where a recycle passage merges with the fluid passage, the recycle passage being a passage through which part of the hydrogen-containing gas that is fed from a reformer is supplied to the hydrodesulfurization catalyst;
causing a booster to operate, the booster being provided on a fluid passage between the reformer and the merging point where the recycle passage merges with the fluid passage; and
supplying, by the oxidizing gas supply device, the oxidizing gas to a fluid passage between the reformer and an upstream end of the recycle passage.

15. The method of operating a fuel cell system according to claim 1, wherein the catalyst is at least one of a shift conversion catalyst, a hydrodesulfurization catalyst, a methanation catalyst and a reforming catalyst.

16. The method of operating a fuel cell system according to claim 1, wherein the catalyst includes at least one of Ni, Cu, Zn and Mo.

17. The method of operating a fuel cell system according to claim 1, wherein the raw material is an organic compound comprised of at least carbon and hydrogen.

* * * * *